United States Patent
Bridges et al.

(10) Patent No.: US 11,649,704 B2
(45) Date of Patent: May 16, 2023

(54) PROCESSES AND SYSTEMS FOR INJECTION OF A LIQUID AND GAS MIXTURE INTO A WELL

(71) Applicant: LIFT IP ETC, LLC, Gordonville, TX (US)

(72) Inventors: Timothy J. Bridges, Gordonville, TX (US); Stuart L. Scott, Pearland, TX (US); Paulo Waltrich, Baton Rouge, LA (US); H. Lee Norris, Bellaire, TX (US)

(73) Assignee: LIFT IP ETC, LLC, Gordonville, VA (US)

( * ) Notice: Subject to any disclaimer, the term of this patent is extended or adjusted under 35 U.S.C. 154(b) by 0 days.

(21) Appl. No.: 17/047,312

(22) PCT Filed: Apr. 11, 2019

(86) PCT No.: PCT/US2019/027039
§ 371 (c)(1),
(2) Date: Oct. 13, 2020

(87) PCT Pub. No.: WO2019/200138
PCT Pub. Date: Oct. 17, 2019

(65) Prior Publication Data
US 2021/0148200 A1    May 20, 2021

Related U.S. Application Data

(60) Provisional application No. 62/656,794, filed on Apr. 12, 2018.

(51) Int. Cl.
*E21B 43/12* (2006.01)
*G05B 19/4155* (2006.01)
(Continued)

(52) U.S. Cl.
CPC ............ *E21B 43/122* (2013.01); *E21B 43/16* (2013.01); *G05B 19/4155* (2013.01);
(Continued)

(58) Field of Classification Search
CPC .............................. E21B 43/122; E21B 43/16
(Continued)

(56) References Cited

U.S. PATENT DOCUMENTS

| 4,711,306 A | 12/1987 | Bobo |
| 6,039,116 A | 3/2000 | Stevenson et al. |

(Continued)

OTHER PUBLICATIONS

International Preliminary Report on Patentability received for PCT Application No. PCT/US2019/027036, dated Oct. 22, 2020, 8 pages.
(Continued)

*Primary Examiner* — William D Hutton, Jr.
*Assistant Examiner* — Ashish K Varma
(74) *Attorney, Agent, or Firm* — Shook, Hardy & Bacon L.L.P.

(57) ABSTRACT

Processes and systems for injecting a liquid and gas mixture into a well are disclosed. The processes and systems include injecting a mixture of a liquid and a gas into a well in order to: increase production of a production fluid in the well, decrease the bottom hole pressure, decrease the density of the production fluid, or a combination thereof.

19 Claims, 12 Drawing Sheets

(51) Int. Cl.

| | | |
|---|---|---|
| *E21B 43/16* | (2006.01) | |
| *E21B 49/08* | (2006.01) | |
| *E21B 47/07* | (2012.01) | |
| *E21B 47/04* | (2012.01) | |
| *E21B 47/06* | (2012.01) | |
| *E21B 47/08* | (2012.01) | |

(52) U.S. Cl.
CPC .............. *E21B 47/04* (2013.01); *E21B 47/06* (2013.01); *E21B 47/07* (2020.05); *E21B 47/08* (2013.01); *E21B 49/0875* (2020.05); *G05B 2219/45014* (2013.01)

(58) Field of Classification Search
USPC ....................................................... 166/305.1
See application file for complete search history.

(56) References Cited

U.S. PATENT DOCUMENTS

| | | | |
|---|---|---|---|
| 7,114,557 B2 | 10/2006 | Cudmore et al. | |
| 8,371,390 B2* | 2/2013 | Quinlan ................ | E21B 33/122 166/401 |
| 2001/0040033 A1* | 11/2001 | Schnatzmeyer ...... | E21B 43/123 166/250.15 |
| 2005/0173114 A1 | 8/2005 | Cudmore et al. | |
| 2006/0162922 A1* | 7/2006 | Chung ................ | E21B 43/2406 166/245 |
| 2006/0196674 A1 | 9/2006 | Butler et al. | |
| 2007/0068672 A1 | 3/2007 | Jalali et al. | |
| 2007/0199705 A1 | 8/2007 | Hocking et al. | |
| 2007/0204991 A1 | 9/2007 | Loree et al. | |
| 2008/0257556 A1* | 10/2008 | Kippie .................. | E21B 43/122 166/372 |
| 2013/0153218 A1* | 6/2013 | Boone .................. | E21B 43/121 166/272.3 |
| 2013/0292122 A1 | 11/2013 | Nichols et al. | |
| 2016/0230513 A1 | 8/2016 | Dykstra et al. | |
| 2020/0263525 A1 | 8/2020 | Reid et al. | |

OTHER PUBLICATIONS

International Preliminary Report on Patentability received for PCT Application No. PCT/US2019/027039, dated Oct. 22, 2020, 12 pages.
International Search Report in related application PCT/US2019/027039, dated Jun. 26, 2019, 19 Pages.
Non-Final Office Action dated Jun. 16, 2022 in U.S. Appl. No. 17/046,405, 14 pages.
Brill, J. P. and Mukherjee, H., "Multiphase Flow in Wells", Society of Petroleum Engineers Inc., pp. 1-149 (1999).
"Recommended Practices for Operation, Maintenance, Surveillance, and Troubleshooting of Gas-lift Installations", American Petroleum Institute, p. 138 (Mar. 2015).
Turner, R. G. "Analysis and Prediction of Minimum Flow Rate for the Continuous Removal of Liquids from Gas Wells", Journal of Petroleum Technology, pp. 1475-1482 (Nov. 1969).
Coleman, S. B. et al., "A New Look at Prediction Gas-Well Load-Up", Journal of Petroleum Technology, pp. 329-333 (Mar. 1991).

* cited by examiner

PROCESSES AND SYSTEMS FOR
INJECTION OF A LIQUID AND GAS
MIXTURE INTO A WELL

CROSS-REFERENCE TO RELATED
APPLICATIONS

This application claims priority to U.S. Provisional Application No. 62/656,794, filed Apr. 12, 2018, and entitled Liquid Assisted Gas-Lift, the entire contents of which is incorporated by reference herein.

FIELD OF THE INVENTION

Processes and systems for injecting a liquid and gas mixture into a well are provided.

BACKGROUND OF THE INVENTION

Conventionally, various processes have been utilized to facilitate extraction of an oil and/or gas from a well. For instance, certain conventional artificial lift methods, such as a conventional gas lift method, have been utilized to initiate production. In certain processes, such conventional gas lift systems can be inefficient and resource intensive. It would be desirable to develop processes and systems that are more efficient, and that can increase well production.

Figure 1:
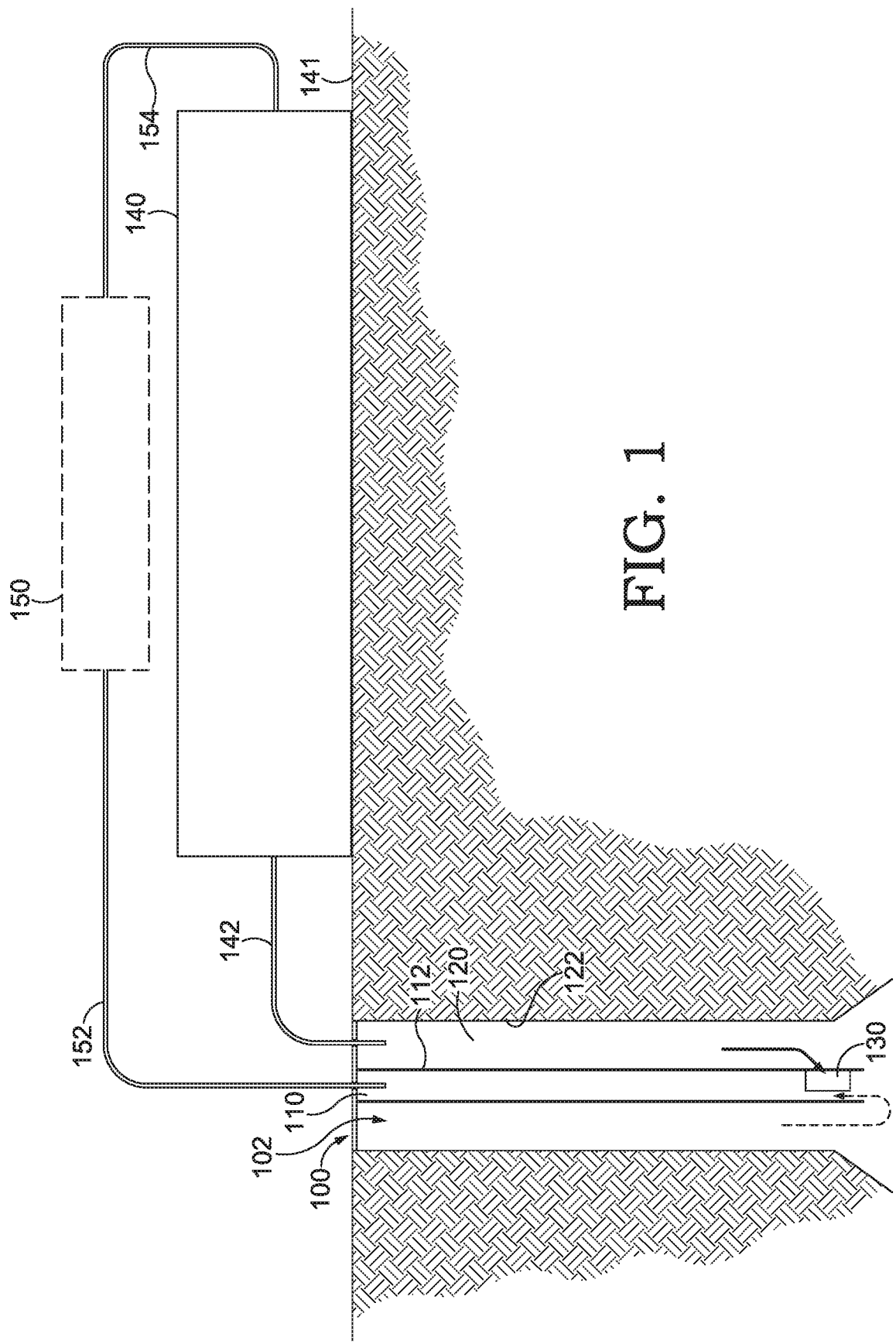
FIG. 1 is a schematic view of a well for illustrating various aspects of the processes and systems described herein.

DETAILED DESCRIPTION OF THE
INVENTION

Overview

In various aspects, processes and systems for injecting a liquid and gas mixture into a well are provided. In aspects, the processes can include injecting a liquid and gas mixture into a well to decrease the density of the production fluid. In such aspects, the decrease in density of the production fluid may enhance or increase production of the well. In the same or alternative aspects, the processes can include injecting a liquid and gas mixture into a well while the well is producing, and the injecting of the liquid and gas mixture may facilitate an increase in well production.

As noted above, certain conventional systems and processes, such as artificial gas lift systems, can be inefficient and resource intensive. For example in certain conventional gas lift systems, the source gas pressure can limit the depth at which the gas can be injected into the well, which may limit the ability of the gas lift process to effectively initiate extraction. Further, there is a need for processes and systems that can increase production of an already-producing well.

The systems and processes disclosed herein can alleviate one or more of these issues. For example, in certain aspects as described herein, it has been unexpectedly discovered that injecting a mixture of a liquid and a gas into a well that is currently producing can increase production of the well. In one aspect, injecting a mixture of a liquid and gas into a well that is currently producing can increase production of the well by about 5% to about 200%.

In further aspects, systems and processes disclosed herein that relate to the injection of a mixture of a liquid and a gas into a well can provide efficient enhanced well production while utilizing less resources than that required of a conventional process. For instance, the systems and process disclosed herein that relate to the injection of a mixture of a liquid and a gas can enhance production of a well using a deep-set valve (or no valve in some aspects), unlike in conventional systems that rely on multiple valves to kick off production as a way to inject the gas further downhole. Stated differently, the systems and processes disclosed herein can inject the mixture of the liquid and gas further downhole than what conventional processes are able to do, which can result in increased efficiency and/or increased well production compared to conventional gas lift processes.

Further as discussed below, the flow rate of the liquid and gas mixture and/or the compositional parameters of the mixture can be tailored based on identifying one or more of: well geometry parameters, well productivity parameters, produced fluids properties, or surface production parameters. In such aspects, the processes and systems described herein can be optimized for specific well parameters and/or for specific identified production parameters, which can enhance production from the well and provide an efficient use of resources.

Accordingly, in one aspect a method for injection of a liquid and a gas mixture into a well is provided. The well can be producing a production fluid at a first production rate. The well can include a borehole extending into the ground to a formation, the borehole having at least one production tubing extending through at least a portion of the borehole. The method can include injecting a first mixture of a liquid and a gas into the well while the well is producing the production fluid at the first production rate, where the first mixture is injected at a first flow rate to cause the well to increase production of the production fluid to a second production rate that is greater than the first production rate.

In another aspect, a method for injection of a liquid and gas mixture into a producing well is provided. The well can include a borehole extending into the ground to a formation, the borehole having at least one production tubing extending through at least a portion of the borehole. The method can include injecting a first mixture of a liquid and a gas into the well while the well is producing a first volume of production fluid, the first volume of production fluid having a first density. The first mixture can be injected at a first flow rate thereby resulting in the formation of a second volume of production fluid, the second volume of production fluid having a second density that is less than the first density.

In yet another aspect, a computing device is provided. The computing device can have at least one processor and computer-readable instructions stored thereon. The computer-readable instructions, when executed by the at least one processor can cause the computing device to: identify one or more of: well geometry parameters, well productivity parameters, produced fluids properties, or surface production parameters; and based on the identifying one or more of: well geometry parameters, well productivity parameters, produced fluids properties, or surface production parameters, determine a first flow rate of a liquid, a gas, or a liquid and gas mixture, for injecting into a well to increase well production of a production fluid.

In another aspect, one or more nontransitory computer storage media is provided. The nontransitory computer readable media can store computer-useable instructions that, when used by one or more computing devices, cause the one or more computing devices to perform operations including: identifying one or more of: well geometry parameters, well productivity parameters, produced fluids properties, or surface production parameters; and based on the identifying one or more of: well geometry parameters, well productivity parameters, produced fluids properties, or surface production parameters, determining a first flow rate of a liquid, a gas, or a liquid and gas mixture, for injecting into a well to increase well production of a production fluid.

Injection of a Liquid and Gas Mixture During Well Production: Processes and Mixture Parameters As discussed above in certain aspects, the processes and systems described herein can include injecting a liquid and gas mixture into a well while the well is producing in order to increase production of the well. In aspects, a well that is producing or currently producing can refer to a well where a production fluid, such as oil and/or gas, is being extracted out of the well and to the surface. In one aspect, a well that is producing can refer to a well that is producing about one barrel of crude oil per day (bpd) or more, about five bpd or more, or about 15 bpd or more.

In certain aspects, injecting a liquid and gas mixture into a well while the well is producing can increase production of the well by about 5% or more, about 20% or more, about 30% or more, or about 50% or more. In the same or alternative aspects, injecting a liquid and gas mixture into a well while the well is producing can increase production of the well by about 5% to about 200%, about 10% to about 150%, or by about 20% to about 100%. It should be appreciated that an increase in well production is preferably described in terms of a percent increase in production, as such a measure is independent of the well parameters and/or reservoir parameters. In one aspect, injecting a liquid and gas mixture into a well while the well is producing can increase production of the well by about five bpd or more, about 10 bpd or more, or about 20 bpd or more.

In aspects, as discussed above, injecting a liquid and gas mixture into a well can decrease the density of the production fluid. In aspects, injecting a liquid and gas mixture into a well can decrease the density of the production fluid by about 5% or more, about 10% or more, or about 15% or more, or about 5% to about 50%, or about 5% to about 20%.

FIG. 1 depicts an example well 100 in relation to the processes described herein. The well 100 includes a borehole 102 that extends into the ground to a formation (not depicted in the figures). In the aspect depicted in FIG. 1, the borehole 102 includes a production tubing 110 extending through at least a portion of the borehole 102 and is adapted to permit production fluids, including but not limited to crude oil, to be extracted from the formation. Further, as can be seen in FIG. 1, there is a annulus 120 that is the space between the exterior 112 of the production tubing 110 and the surface 122 of the borehole 102.

With continued reference to FIG. 1, in aspects, a mixture of the liquid and the gas may be produced and/or provided at a location adjacent the well 100. In one aspect, one or more sources 140 can provide the liquid, the gas, and/or the mixture of the liquid and gas. In certain aspects, the one or more sources 140 can be present on the surface 141 of the ground adjacent the well 100. In various aspects, the mixture of the liquid and the gas can be provided into the well 100 via a conduit 142.

In the aspect depicted in FIG. 1, the conduit 142 is configured to provide the mixture into the annulus 120. In such aspects, the mixture of the liquid and the gas may travel down the borehole 102 to a deep-set valve 130 coupled to the production tubing 110, where the mixture is transported into the production tubing 110, as indicated by the solid arrow extending down to the deep-set valve 130. In an aspect not depicted in the figures, there may not be a valve at or near the bottom of the production tubing and the systems described herein can provide the mixture to the bottom of the production tubing where such mixture can enter the production tubing, as indicated by the dashed arrow extending down the annulus 120 and into the production tubing 110.

It should be understood that while this one example well 100, in relation to the processes described herein depicted in FIG. 1, describes the mixture of the liquid and the gas being injected into the annulus 120 and ultimately into the production tubing 110 to facilitate extraction of production fluids by traveling through the production tubing 110 and out of the well 100, an alternative operation is also contemplated by the systems and processes described herein. For instance, in one aspect, the gas and liquid mixture can be injected directly into the production tubing 110 and thereby travel downhole and enter the annulus 120 via a valve or bottom of the tubing to facilitate extraction of production fluids out and through the annulus 120.

In certain aspects, as discussed above, a mixture of a liquid and a gas is injected into a well, e.g., the well 100 of FIG. 1 to increase production of the well. In one or more aspects, without being bound by any particular theory it is believed that the mixtures described herein, when injected, can decrease the density of at least a portion of the production fluid in the well, which in turn can increase well production, e.g., by releasing additional pressure from the reservoir.

In aspects, the liquid can include water, hydrocarbons, or a combination thereof. In aspects, the hydrocarbons can include crude oil. In the same or alternative aspects, the liquid can include a production fluid, e.g., a crude oil, produced from the well where the injection process is occurring. In a preferred aspect, the liquid includes crude oil.

In certain aspects, the gas can include hydrocarbons, air, or a combination thereof. In various aspects, the gas can include methane, ethane, propane, butane, air, or a combination thereof. In a preferred aspect, the gas includes methane.

In certain aspects, the gas can be present in the mixture in an amount of from 10% by volume of the mixture to 99% by volume of the mixture, 30% by volume of the mixture to 95% by volume of the mixture, or 40% by volume of the mixture to 85% by volume of the mixture. In such aspects, the volume of the gas in the mixture refers to the mole fraction volume as determined at standard temperature and pressure.

In aspects, one or more chemical additives can optionally be added to the liquid and gas mixture for one or more purposes. For instance in one aspect, the chemical additives can include surfactants, de-emulsifiers, emulsifiers, drag reducing agents, or other chemical additives known to have an impact on multiphase flow and the pattern of flow, such as impacting the transition from one flow pattern to another. In the same or alternative aspects, the chemical additives can include chemical additives that are known to reduce the required surface injection pressures, to reduce the amount of fluid co-injected with the gas in the downward annular injection flow. In various aspects, the chemical additives can include chemical additives that are known to alter the flow in the production string downstream of the gas or mixture injection point and to alter the flow in a horizontal and near-horizontal sections of pipe such as the horizontal well. In the same or alternative aspects, the chemical additives can include scale inhibitors and/or corrosion inhibitors. In aspects, the chemical additives can include chemical additives that are different than the liquid being utilized the liquid and gas mixture.

Returning now to FIG. 1, as noted above, in certain aspects, the liquid may include a production fluid, e.g., a crude oil, produced from the well where the injection process is occurring. In aspects, a conduit 152 is coupled to the production tubing 110, which can provide a stream of the production fluid, e.g., a crude oil, for further use in the injection processes described herein. As can be seen in FIG. 1, the production fluid from the well, e.g., via the conduit 152, can be optionally exposed to one or more post-production systems or processes, e.g., one or more post-production processes 150 of FIG. 1, prior to its use in the injection processes. In such an aspect, the production fluid may exit the one or more post-production systems or processes 150 via a conduit 154 and be returned to the one or more sources 140. A non-limiting list of post-production systems and processes includes the use of one or more separators to remove water, other liquids, and/or gas, and the use of a storage vessel from which the crude oil can be withdrawn.

As discussed above, in various aspects, the processes disclosed herein can include injecting a mixture of a liquid and a gas into a well in order to increase production of the well. In certain aspects, the mixture of the liquid and the gas can be formed using equipment that is convenient for use in an oil well setting. Example systems that can be utilized to perform the processes described herein are described further below with reference to FIGS. 5A-12. Prior to discussing these example systems, the processes will be further described.

Figure 2:
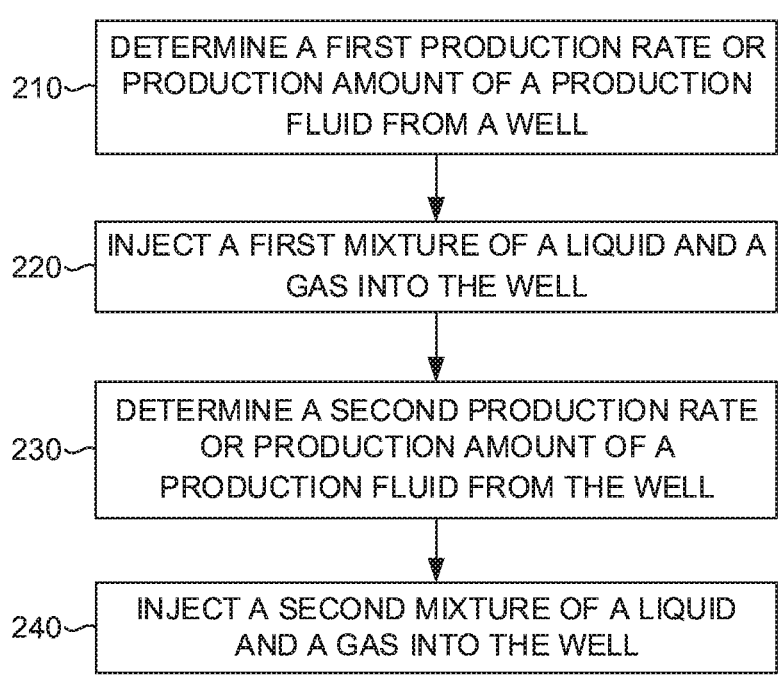
FIG. 2 is a flow diagram illustrating one method for injection of a liquid and gas mixture into a well, in accordance with aspects described herein.

FIG. 2 depicts a flow diagram illustrating a method 200 for injection of a liquid and a gas mixture into a well. In aspects, the processes disclosed herein can include injecting a liquid and gas mixture into a well while the well is producing a production fluid. In one aspect, the production fluid can include oil and/or gas. At step 210, the method 200 can include determining a first production rate or production amount of the production fluid at a first time. In such aspects, the production rate or amount may be monitored using any convenient flow meter of flow gauge. In one or more aspects, the initial production rate of the well may be determined in order to discern a baseline or average production level, e.g., in order to determine when production increases from such a baseline level, or to determine when to adjust injection parameters as discussed further below. Alternately, or in addition, at step 210, the bottom hole pressure can be determined, e.g., using any convenient pressure gauge suitable for use in a well downhole. In aspects, the bottom hole pressure can be measured in a region near a deep-set valve, or at or near the bottom of the production tubing, e.g., within 30 meters, within 20 meters, or within 10 meters of such a deep-set valve or bottom of the production tubing. Additionally or alternatively, in aspects, the bottom hole pressure can be estimated based on the flow rate of the liquid, the flow rate of the gas, and the well geometry parameters, which are discussed further below with respect to an example injection system.

At step 220, the method 200 can include injecting a first mixture of a liquid and a gas into the well. The mixture, the liquid, and the gas can have any or all of the respective parameters discussed above for the mixture, liquid, and/or the gas. For instance in one aspect, the liquid can include crude oil, and the gas can include methane. In a further aspect, at least a portion of the crude oil present in the mixture can include a crude oil derived from the production fluid of the well at a time prior to injecting the mixture into the well.

At step 230, the method 200 can include determining a second production rate or production amount of the production fluid at a second time. In one aspect, the second production rate or production amount is determined subsequent to injecting the mixture of the liquid and the gas into the well performed at the step 220. In aspects, the second production rate can be determined in a manner similar to that described above with respect to the step 210. Further, in an alternate aspect or in addition, the step 230 may include determining bottom hole pressure in a manner similar to that described above with respect to the step 210. In aspects, the second production rate may be increased relative to the first production rate. In such aspects, the increase in production rate can be similar to that described above. For instance, the second production rate or amount can be increased by about 5% or more, about 20% or more, about 30% or more, or about 50% or more; or of from about 5% to about 200%, about 10% to about 100%, by about 20% to about 100%, or by about 20% to about 50%.

At step 240, the method can include injecting a second mixture of the liquid and the gas into the well. In aspects, the step 240 can occur subsequent to one or more of the steps 210, 220, or 230. In various aspects, as discussed above, it may be desirable to reduce the bottom hole pressure and/or the pressure in the production tubing in an effort to increase production. Furthermore, in various aspects, it may be beneficial to minimize the amount of liquid being injected into the well, e.g., while the well is producing in an effort to conserve resources. In such aspects, the second mixture injected at step 240 may comprise a reduced amount of the liquid compared to the first mixture injected at the step 210, e.g., in order to increase the production rate of the production fluid or production amount and/or to decrease the bottom hole pressure. In the same or alternative aspects, the first mixture injected at the step 210 may comprise an increased amount of gas relative to the second mixture injected at the step 240, e.g., in order to increase the production rate of the production fluid or production amount and/or to decrease the bottom hole pressure.

Figure 3:
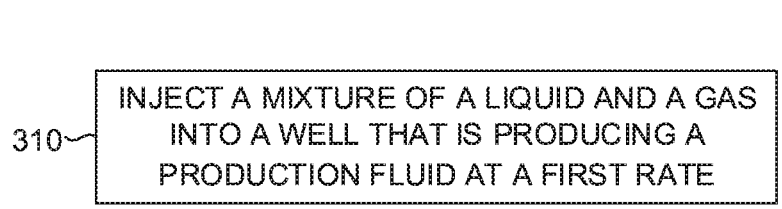
FIG. 3 is a flow diagram illustrating another method for injection of a liquid and gas mixture into a well, in accordance with aspects described herein.

FIG. 3 depicts a flow diagram illustrating a method 300 for injection of a liquid and a gas mixture into a well. In aspects, the mixture of the liquid and gas can be injected into a well that is producing a production fluid. In one aspect, the production fluid can include oil and/or gas. In one aspect, the well can include a borehole extending into the ground to a formation, where the borehole comprises at least one production tubing extending through at least a portion of the borehole, such as that depicted in FIG. 1.

At step 310, the method 300 can include injecting a mixture of a liquid and a gas into the well. In certain aspects, injecting a mixture of a liquid and a gas into the well of step 310 can occur while the well is producing a production fluid at a first production rate. In various aspects, the mixture, the liquid, and/or the gas can have any or all of the respective parameters discussed above for the mixture, liquid, and/or the gas. For instance in one aspect, the liquid can comprise crude oil, and the gas can include methane. In a further aspect, at least a portion of the crude oil present in the mixture can include a crude oil derived from the production fluid of the well at a time prior to injecting the mixture into the well. In various aspects, as discussed above gas can be present in the mixture in an amount of from 10% by volume of the mixture to 99% by volume of the mixture, 30% by volume of the mixture to 95% by volume of the mixture, or 40% by volume of the mixture to 85% by volume of the mixture.

In various aspects, the mixture of the liquid and the gas is injected at a first flow rate to cause the well to produce the production fluid at a second production rate that is greater than the first production rate. In such aspects, the increase in production can include any or all of the parameters for increasing production of a well discussed above. For instance, in aspects, injecting the mixture into the well can increase production of the production fluid by about 5% to about 200%, about 10% to about 150%, or by about 20% to about 100%; and/or may increase production of the production fluid by about five bpd or more, about 10 bpd or more, or about 20 bpd or more.

Figure 4:
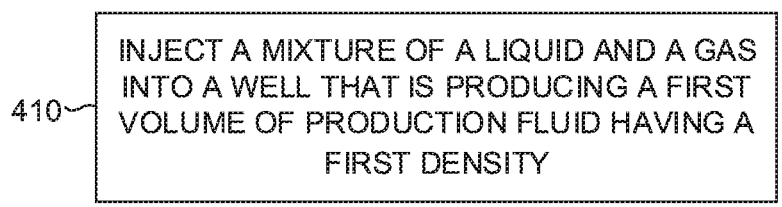
FIG. 4 is a flow diagram illustrating yet another method for injection of a liquid and gas mixture into a well, in accordance with aspects described herein.

FIG. 4 depicts a flow diagram illustrating a method 400 for injection of a liquid and a gas mixture into a well. In aspects, the mixture of the liquid and gas can be injected into a well that is producing a production fluid. In one aspect, the production fluid can include oil and/or gas. In one aspect, the well can include a borehole extending into the ground to a formation, where the borehole comprises at least one production tubing extending through at least a portion of the borehole, such as that depicted in FIG. 1.

At step 410, the method 400 can include injecting a mixture of a liquid and a gas into the well. In aspects, injecting a mixture of a liquid and a gas into the well of step 410 can occur while the well is producing a first volume of production fluid having a first density. In various aspects, the mixture, the liquid, and/or the gas can have any or all of the respective parameters discussed above for the mixture, liquid, and/or the gas. For instance, in one aspect, the liquid can comprise crude oil, and the gas can include methane. In a further aspect, at least a portion of the crude oil present in the mixture can include a crude oil derived from the production fluid of the well at a time prior to injecting the mixture into the well. In various aspects, as discussed above gas can be present in the mixture in an amount of from 10% by volume of the mixture to 99% by volume of the mixture, 30% by volume of the mixture to 95% by volume of the mixture, or 40% by volume of the mixture to 85% by volume of the mixture In various aspects, the mixture of the liquid and the gas can be injected at a first flow rate resulting in the well producing a second volume of production fluid having a second density. In such aspects, the second density of the second volume of production fluid can be less than the first density of the first production fluid. In certain aspects, the decrease in density of the production fluid can include any or all of the decrease in density parameters discussed above. For example, in aspects, injecting a mixture of a liquid and a gas into the well can decrease the density of the production fluid by about 5% or more, about 10% or more, or about 15% or more, or of from about 5% to about 50%, or of from about 5% to about 20%.

In aspects, the decrease in density of the production fluid may also increase overall well production. For instance in such aspects, injecting the mixture into the well can increase production of the production fluid by about 5% to about 200%, about 10% to about 150%, or by about 20% to about 100%; and/or may increase production of the production fluid by about five bpd or more, about 10 bpd or more, or about 20 bpd or more.

As discussed above in certain aspects, the mixture of the liquid and the gas is injected into the well at a flow rate optimized or tailored to cause the well to increase production, to decrease the density of the production fluid, and/or to decrease the downhole pressure. In various aspects, the flow rate of the mixture of the liquid and the gas can be determined based on the example systems and processes described below. For instance in aspects discussed further below, the flow rates of the liquid, the gas, and/or the mixture, and the relative amounts of the liquid and/or gas can be tailored in the mixture to facilitate increased well production, decrease the density of the production fluid, and/or to decrease downhole pressure. In one example, if too little liquid is present in the mixture, then there may be insufficient hydrostatic pressure to allow gas to be circulated to the tubing or downhole injection point. Further, in certain aspects, if too little gas is present in the mixture, the downhole pressure and/or the density of the production fluid may not decrease to a desired level, e.g., a level that may facilitate increased well production. In addition, in various aspects, the liquid injection rate can be tailored to create sufficient mixture velocity to carry gas bubbles downward to a deep-set valve.

As discussed above, in certain aspects, the relative amounts of the gas and liquid in the mixture and/or the flow rate of the mixture can be tailored to facilitate increased well production. Additionally or alternatively, in certain aspects, the relative amounts of the gas and liquid in the mixture and/or the flow rate of the mixture can be tailored based on identifying one or more of well geometry parameters, well productivity parameters, produced fluids properties, or surface production parameters. Certain well geometry parameters, well productivity parameters, produced fluids properties, and surface production parameters are described in: Brill, J. P., & Mukherjee, H. K. (1999) *Multiphase Flow in Wells*, Society of Petroleum Engineers, SPE Monograph Series Vol. 17, ISBN: 978-1-55563-080-5, the entirety of which is incorporated by reference herein; and in Shoham, O. (2006) *Mechanistic Modeling of Gas-Liquid Two-Phase Flow in Pipes*, Society of Petroleum Engineers, ISBN 978-1-55563-107-9, the entirety of which is incorporated by reference herein.

In various aspects, the well geometry parameters can include any physical parameters of the well, or associated tubing, casings, or the like found in conventional oil wells. In certain aspects, a non-limiting list of well geometry parameters includes: an internal diameter of well tubing, an external diameter of well tubing, an internal diameter of a casing string, a depth of the casing string, an inclination of the casing string, a diameter of the vertical wellbore section, depth of the vertical section, depth of the injection valve, or a combination thereof.

In aspects, the produced fluids properties can include any properties or parameters associated with the fluids produced or extracted from the well. In certain aspects, a non-limiting list of the produced fluids properties includes: a density of the well-produced fluids, an API gravity of the produced fluids, such as an API gravity of the oil or condensate, a viscosity of the well-produced fluids, a pressure of the well-produced fluids, a volume of the well-produced fluids, a temperature of the well-produced fluids, or a combination thereof.

In various aspects, the well productivity parameters can include parameters and/or properties associated with the productivity of the well. In certain aspects, a non-limiting list of the well productivity parameters includes an average reservoir pressure, a flow potential for the well, recent production rates from the well, such as 30 day average of an oil or condensate rate (barrels per day), a 30 day average water rate (barrels per day), a 30 day average gas rate (thousand standard cubic feet per day-mscf/D), a flowing tubing pressure, a well head pressure, a choke setting, a well head flowing temperature, or a combination thereof.

In aspects, the surface production parameters can include properties and/or parameters associated with the gas source, the liquid source, or the mixture of the liquid and gas being injected into the well or to be injected into the well. In the same or alternative aspects, the surface production parameters can include well head or casing head properties. In certain aspects, a non-limiting list of the surface production parameters includes: a gas conduit pressure, a liquid conduit pressure, an injection point pressure, a liquid and gas mixture conduit pressure, an outlet pressure, a well head shut-in pressure, a well head shut-in temperature, a production line pressure, a separator pressure, a casing head shut-in temperature, a casing head shut-in pressure, the gas volume available or extractable from the gas source, source gas pressure, or a combination thereof.

In aspects, the relative amounts of the gas and liquid in the mixture and/or the flow rate of the mixture can be tailored based on identifying one or more of: a diameter of the vertical wellbore section, depth of the vertical section, the gas volume available or extractable from the gas source, source gas pressure, an API gravity of the produced fluids, such as an API gravity of the oil or condensate, oil or condensate average rate (barrels per day), a water average rate (barrels per day), a gas average rate (thousand standard cubic feet per day-mscf/D), or a flowing tubing pressure.

In certain aspects, the liquid and/or gas injection or flow rates sufficient to facilitate downward bubble flow in the well can be determined based on one or more of the properties discussed above, e.g., the well geometry parameters, well productivity parameters, produced fluids properties, or surface production parameters. As discussed further below, in various aspects, the downward bubble flow in the well can be facilitated to occur in the tubing casing annulus or annulus of the well, such as for example the annulus 120 of FIG. 1. In an alternative aspect, downward bubble flow in the well can be facilitated to occur in the tubing of the well.

In various aspects, optimizing the liquid and/or gas flow rates may employ the determination of various properties associated with the well or the injection system and/or may employ specific control methods of the injection system and processes disclosed herein. For instance, in certain aspects, one or more of the following may be performed to aid in tailoring the flow rate of the liquid and the gas to achieve increased well production: calculating the flow rate sufficient to facilitate downward bubble flow in the tubing casing annulus: calculating the minimum liquid weight required to achieve circulation of gas into the tubing in light of the source gas pressure; calculating the (gas) bubble rise velocity at multiple points in the tubing casing annulus; calculating the fluid levels in the casing or tubing in order to assign various flow regimes; tailoring the flow of the liquid and/or the gas to provide various patterns of high and/or low liquid injection rates. The determination of one or more of these parameters is further discussed below.

A multiphase flow correlation and/or model can be used for downward multiphase flow, such as, but not limited to, the Beggs & Brill correlation shown in equation (1) below. In such aspects, this correlation can aid in determining the liquid and gas injection rates at the surface required to achieve downward bubble flow in the tubing-casing annulus. In such aspects, a minimum liquid velocity must be achieved for injected gas lift gas to move downward can be determined.

$$F_{DRAG} \geq F_{BUOYANCY} \quad (1)$$

In aspects, where chemical additives, such as the chemical additives discussed above are utilized, a homogeneous flow model may be utilized to identify both frictional and gravitational pressure changes in the annulus of the well with the formulas of equations (2), (3), (4), and (5) shown below. This flow model may be utilized to aid in determining the liquid and gas injection rates at the surface required to achieve downward bubble flow in the tubing-casing annulus.

$$\left(\frac{dP}{dx}\right)_{Gravitational} = \rho_m \frac{g}{g_c} \sin\theta \quad (2)$$

$$\left(\frac{dP}{dx}\right)_{Frictional} = \frac{f_m \rho_m v_m^2}{2 g_c d} \quad (3)$$

$$\rho_m = \rho_L \lambda_L + \rho_G (1 - \lambda_L) \quad (4)$$

$$\lambda_L = \frac{Q_L}{Q_L + Q_G} \quad (5)$$

$Q_L$ is the liquid volumetric flow rate at in-situ conditions, $Q_G$ is the gas volumetric flow rate at in-situ conditions, g is the acceleration of gravity, $g_c$ is the gravitation constant and $\theta$ is the inclination of the pipe, $f_m$ is the mixture friction factor, $v_m$ is the velocity of the two-phase mixture at in-situ conditions, d is the diameter of the pipe, $\lambda_L$ is the no-slip liquid holdup, $\rho_L$ is in-situ liquid density, $\rho_G$ is the in-situ gas density and $\rho_m$ is the in-situ mixture density. In aspects, in-situ conditions refers to conditions during operation of the processes disclosed herein.

In one or more aspects as discussed above, the fluid level in the casing/tubing can be determined and one or more flow regimes can be assigned for use. In such aspects, flow modeling can be done for the various regimes of the pipe which may be present in the well at startup which may be assigned single-phase gas, single-phase liquid, and multi-phase (e.g., gas and liquid) designations. This may be done by comparing shut-in wellhead pressures with estimated reservoir pressure, for instance as with equation (6) below.

$$P_{CHSI}=P_{res}-\bar{\rho}_L[D_{bh}-D_{LL}]-\bar{\rho}_G[D_{LL}] \quad (6)$$

$P_{CHSI}$ is the Casing-Head Shut-In Pressure, $P_{res}$ is the average reservoir pressure or an approximation of the buttonhole pressure at shut-in conditions just prior to starting the artificial lift procedure, $\rho_L$ is liquid density, $\rho_G$ is gas density and $D_{bh}$ is the Total Vertical Depth to the reservoir perforations or intake point, and $D_{LL}$ is the depth to the liquid level in the tubing-casing annulus.

In one or more aspects, utilizing one or more of the well geometry parameters, well productivity parameters, produced fluids properties, or surface production parameters, one can determine the gas bubble rise velocity at one or more points in the tubing-casing annulus to ensure that the gas will move downward in the tubing-casing annulus to a deep-set valve. In such aspects, the gas bubble rise velocities can be utilized to determine flow or injection rates of the liquid and gas mixture to create suitable conditions for downward movement of the gas and/or the liquid and gas mixture.

In aspects, based on one or more of the well geometry parameters, well productivity parameters, produced fluids properties, or surface production parameters, one can identify flow patterns for the liquid, gas, or mixture thereof in order to create a specific environment in the tubing-casing annulus for downward movement of the injected gas such that the bubble rise velocity is exceeded by the downward velocity of the liquid and gas mixture. In other words, the relative amounts of gas and liquid injected are important to establish the proper downward multiphase flow pattern to both create the proper hydrostatic, or weight, and achieve a velocity and flow pattern for downward flow of the gas-liquid mixture.

Above, various determinations are described that generally may be associated with the tailoring of the liquid and/or gas flow rate to achieve downward movement of the gas and, e.g., into the production tubing. In various aspects, one or more of the tubing head pressure, tubing head temperature, casing head pressure, or casing head temperature may be monitored in order to modify the injected gas and liquid rates to ensure the gas is circulated through the deep-set valve or around the bottom of the tubing if no valve is used. In such aspects, if casing head pressures increase beyond an expected threshold, additional liquid can be injected to add additional "weight" to keep below the maximum gas source pressure. Further, in such aspects, iterations may be performed between the injection flow pattern calculations and the integrated "weight" history injected during the kick-off process.

In certain aspects as discussed above, it may be desirable to minimize the use of the liquid being injected into the well. For instance, in certain aspects, the liquid injection rate may be initially high in order to facilitate the downward movement of the gas; however, once the gas enters the production tubing, it may be desirable to reduce the injection rate of the liquid. In aspects, prior to changing the liquid flow rate, gas entry into the tubing may be detected through monitoring one or more parameters, such as the tubing head pressure and temperature. For instance, an increase in flowing tubing head pressure may indicate a drop in density of fluids in the tubing string or production tubing caused by the entry of gas. In the same or alternative aspects, the multiphase flow calculations and the monitoring of the casing head pressure may be utilized to detect or determine gas entry into the tubing. For example, a decrease in injection casing head pressure may indicate a drop in density of fluids in the tubing string caused by the entry of gas, multiphase flow velocities can be utilized to determine the time when gas reaches the valve or end-of-tubing if no valve is used, and/or multiphase flow correlations can be utilized to determine the pressure at the injection point by calculating upward flow in the tubing utilizing the measured wellhead tubing flowing pressure.

In aspects, once the gas enters the tubing, an optional adjustment of the liquid injection rate may be pursued. In such aspects, the reduction in liquid injection rates or ramping down can be performed in part by monitoring both the wellhead tubing and casing pressures so that the appropriate parameters are present to maintain gas entry in the production tubing. Further in such aspects, a non-limiting list of various methods for ramping down the liquid injection rate while maintaining the gas entry into the tubing includes: iterating the weight of the fluid column with the wellhead tubing and casing pressures to maintain injection at the downhole injection point; utilizing multiphase flow correlations to predict the pressure at the gas injection point in the tubing (either at the single deep-set valve or at the end of the tubing) and iterating this the downward flow calculation to match the input flowing tubing head pressure and casing head injection pressure; or switching the liquid rates from high to low levels to create slugs of single-phase liquid, bubble or slug/churn flow that travel downward separated by gas bubbles.

Example Injection Systems

FIGS. 5A-8 depict one example system 500 for injecting a liquid and gas mixture into a well, e.g., to increase production in a well. It should be understood that the system 500 depicted in FIGS. 5A-8 is just one example injection system and that other systems and configurations of the components are contemplated by the disclosure herein. Starting with FIGS. 5A and 5B, the exterior portion of housing 510 and a portion of the frame assembly 520 for this example system is depicted. As best seen in FIG. 5B, in aspects, the system 500 can also include one or more of a power distribution system 530, a variable frequency drive 540, and a computing device 550. The power distribution system 530, the variable frequency drive 540, and the computing device 550 will be discussed further below. In certain aspects, the system 500 can be mobile and is capable of being transported to and from a well, and/or transported from one well to another well. In aspects, the system 500 is sized to fit on a flatbed trailer of an 18-wheel tractor trailer. In such aspects, the system 500 can have a length l, as identified in FIG. 5A, of from 1.5 meters (m) to 24 m; 2.4 m to 21 m, or 3 m to 17 m. In the same or alternative aspects, the system 500 can have a width w, as identified in FIG. 5A, of from 0.3 m to 6 m; 0.6 m to 4.5 m, or 0.9 m to 3.7 m. In various aspects, the system 500 can have a height h, as identified in FIG. 5A, of from 0.3 m to 6 m; 0.6 m to 4.5 m, or 0.9 m to 3.7 m. In certain aspects, the system 500 has a mass of from 700 kilograms (kg) to 50,000 kg, from 900 kg to 30,000 kg, or from 1100 kg to 15,000 kg.

Figure 5A:
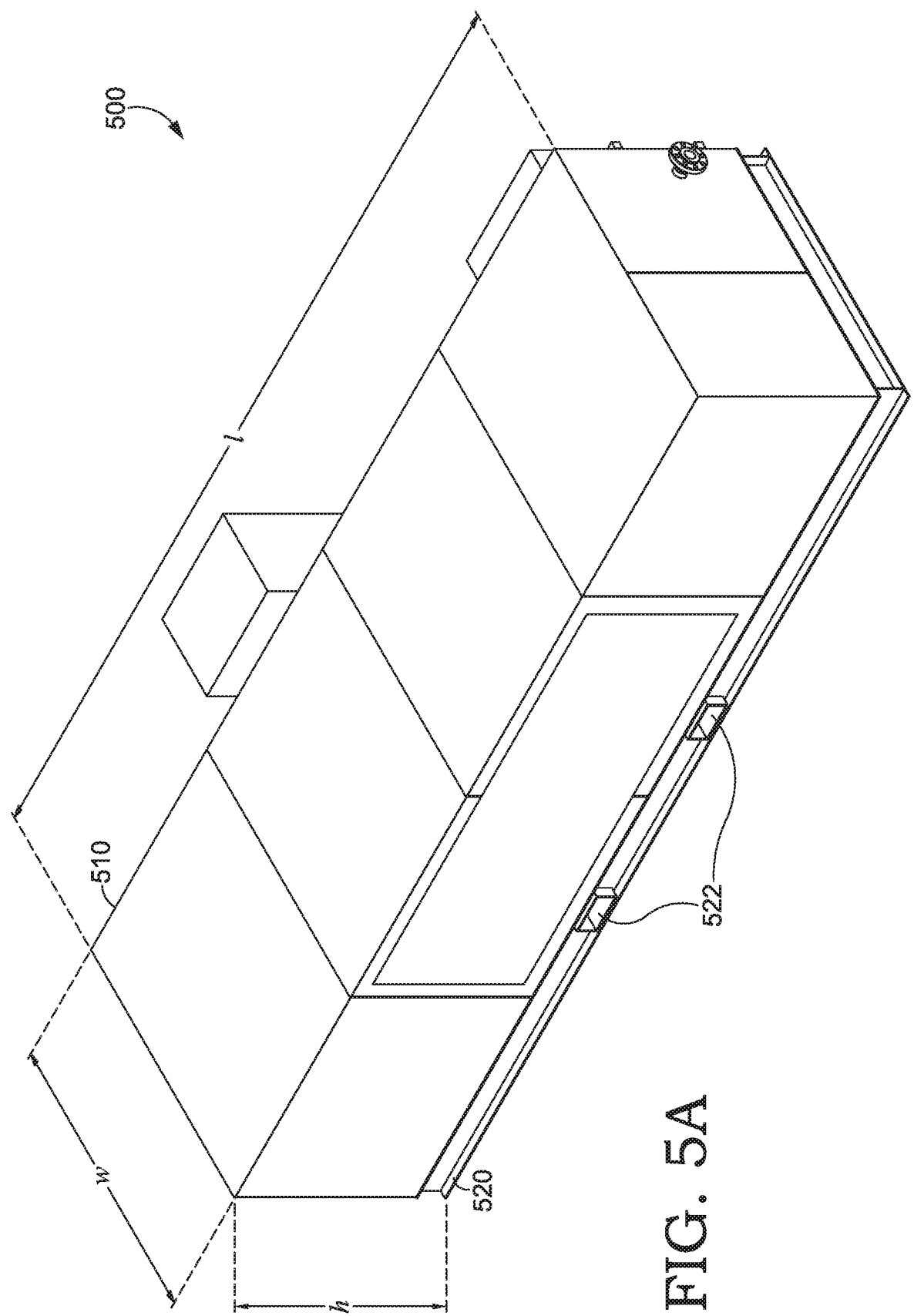
FIG. 5A is a top and side perspective view of an example system for use in implementing certain processes described herein, in accordance with aspects described herein.
Figure 5B:
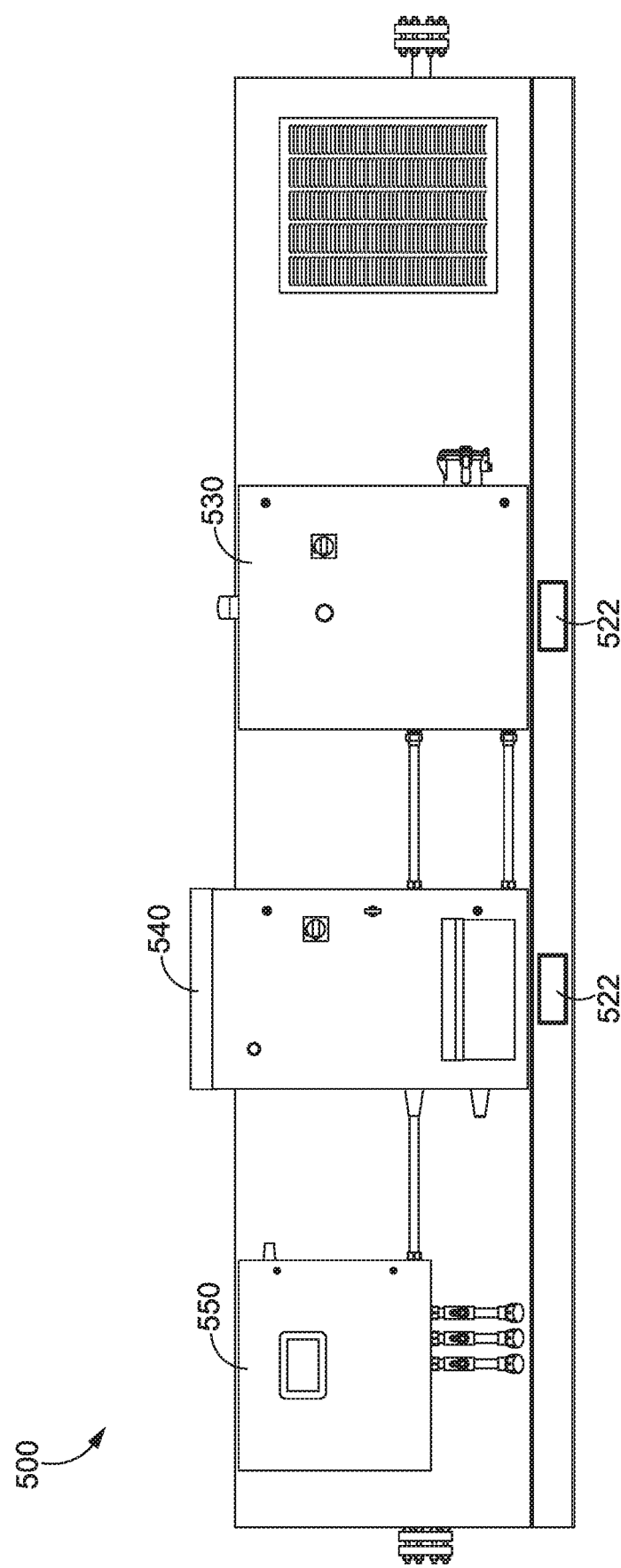
FIG. 5B is a side view of the system of FIG. 5A, in accordance with aspects described herein.

In aspects, as discussed above, the system 500 can be transported from one location to another location. In such aspects, the frame assembly 520 can be adapted to transport the system 500 from one location to another. For example, as can be seen in FIGS. 5A and 5B, the frame assembly 520 can include voids 522 for engaging with a transport device, such as a forklift or crane. In aspects, the frame assembly 520 comprises a metal material that is capable of supporting and transporting the system 500 having a weight of from 700 kg to 50,000 kg, 900 kg to 30,000 kg, or 1100 kg to 15,000 kg. In one aspect, the system 500 can be configured for transport on a trailer.

Figure 6:
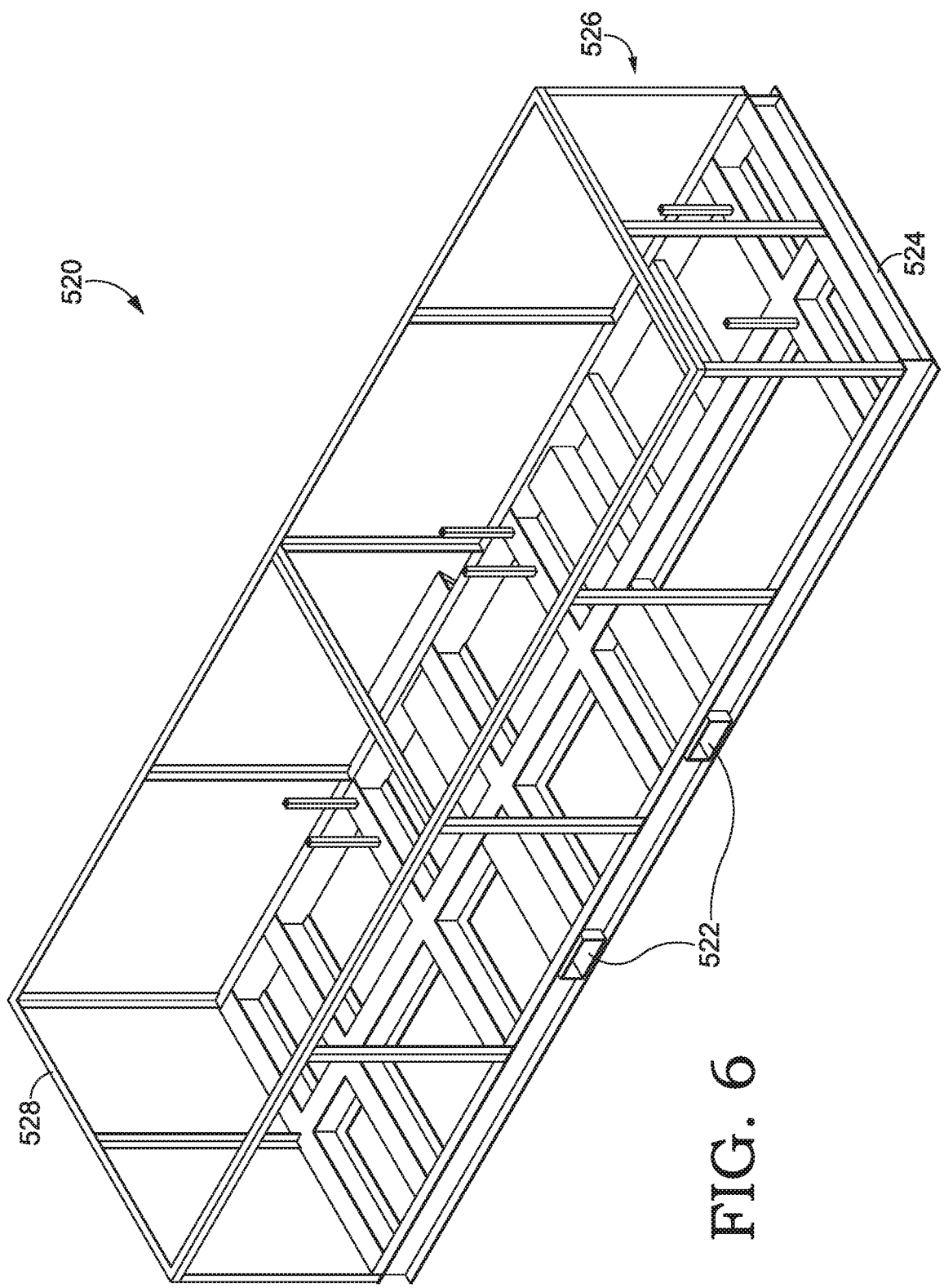
FIG. 6 is a top and side perspective view of the frame assembly and side member supports of the example system of FIG. 5A, in accordance with aspects described herein.

FIG. 6 depicts the frame assembly 520 for the system 500. In the aspect depicted in FIG. 6, the frame assembly 520 includes a base member 524, a plurality of side support members 526 extending up from the base member 524, and a top support member 528. As discussed above, in aspects, the frame assembly 520 can include voids 522 that can be utilized to lift and/or move the system 500. In such aspects, the voids 522 may be defined the base member 524. It is understood that the voids 522 are just one example way that the frame assembly 520 is adapted to transport the system 500 from one location to another and that other modifications and/or additions to the frame assembly 520 that are capable of facilitating the transport of the system 500 are also contemplated by the disclosure herein.

Figure 7:
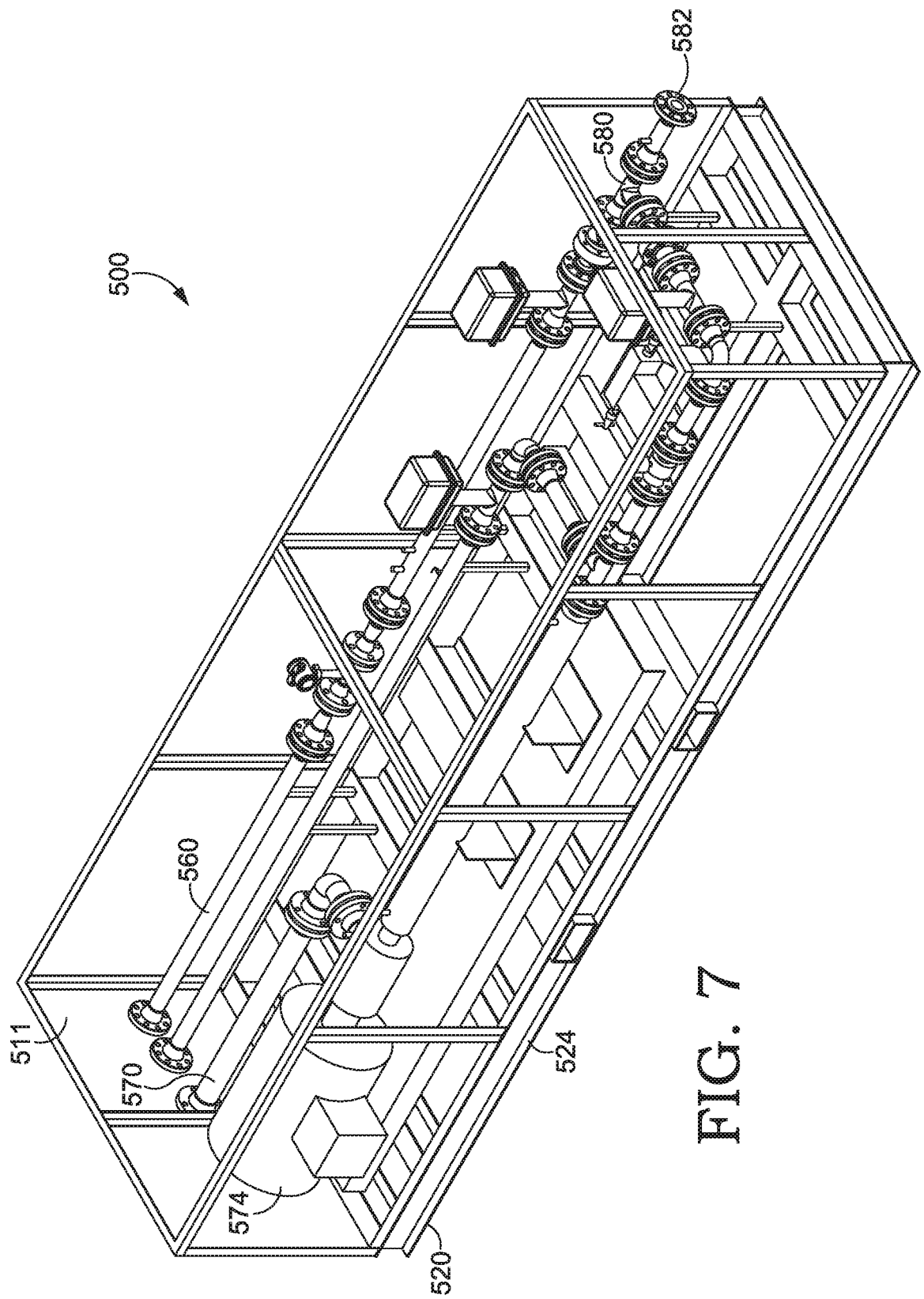
FIG. 7 is a top and side perspective view of the example system of FIG. 5A with the outer housing removed, in accordance with aspects described herein.

FIG. 7 depicts the frame assembly 520 and additional components of the system 500 coupled to the frame assembly 520. In certain aspects, one or more of the additional components of the system 500 can be coupled to the base member 524. In aspects, as discussed further below, the one or more additional components that are coupled to the frame assembly 520 can include, but are not limited to, a gas conduit 560, a liquid conduit 570, a liquid pump 574, a first mixer 580, and an outlet 582. Additional components and associated connections are discussed further below with reference to FIG. 8.

As can be seen in the aspect depicted FIG. 7, at least the gas conduit 560, the liquid conduit 570, the liquid pump 574, and the first mixer 580 are coupled to the frame assembly 520 via the base member 524. In the same or alternative aspects, at least the gas conduit 560, the liquid conduit 570, the liquid pump 574, and the first mixer 580 are coupled to and are positioned within the frame assembly 520 such that at least the gas conduit 560, the liquid conduit 570, the liquid pump 574, and the first mixer 580 are positioned in an interior volume 511 of the housing, e.g., the housing 510 of FIG. 5A.

Figure 8:
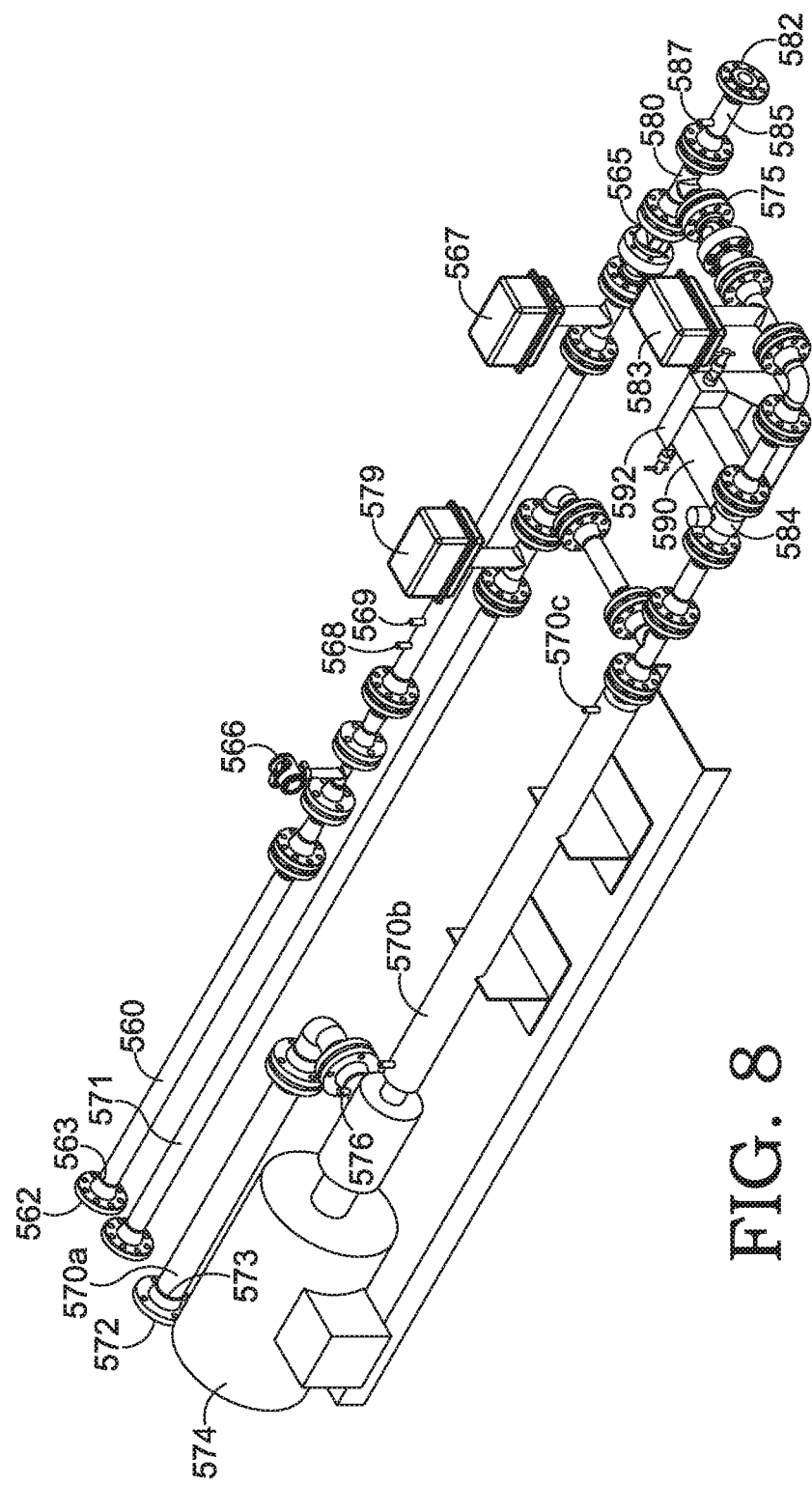
FIG. 8 is a top and side perspective view of the example system of FIG. 2, in the absence of the frame assembly and side member supports to show the liquid conduit, the gas conduit, the chemical additives source, the liquid pump, in addition to other components, in accordance with aspects described herein.

FIG. 8 depicts the additional components of the system 500 also illustrated in FIG. 7 but in the absence of the frame assembly 520. As can be seen in FIG. 8, the system 500 can include, but is not limited to, a gas conduit 560, a liquid conduit 570, a liquid pump 574, a first mixer 580, and an outlet 582.

In the aspect depicted in FIG. 8, the gas conduit 560 can extend between a gas intake 562 at a first gas conduit end 563 and a first mixer 580 at a second gas conduit end 565. In aspects, the gas conduit 560, via the gas intake 562, can be coupled to a source gas. As discussed above, in various aspects, the source gas can include hydrocarbons, air, or a combination thereof. In various aspects, the gas can include methane, ethane, propane, butane, air, or a combination thereof. In a preferred aspect, the gas includes methane. In various aspects not depicted in the figures, a control valve can be placed between the gas supply and the gas intake. For example, the control valve may facilitate connection to a customer provided gas supply. In the same of alternative aspects not depicted in the figures, a choke valve can be placed between the gas supply and the gas intake 562 to control the gas flowing into the gas conduit 560 and the system 500. In such aspects, a computing device, e.g., the computing device 550 of FIG. 5B, may operate or direct the operation of such a choke valve.

In one or more aspects, the gas conduit 560, via the gas intake 562, may direct the gas communicated from the gas source through a gas flow meter 566 and a gas valve 567 to the first mixer 580. In aspects, the gas communicated from the gas source can be pressurized. In certain aspects, a gas pressure gauge sensor 568, a gas temperature gauge sensor 569, or both can be coupled to the gas conduit 560 at a position between the gas intake 562 and the first mixer 580. In various aspects, the gas pressure gauge sensor 568, the gas temperature gauge sensor 569, or both can be adapted to provide gas temperature and/or gas pressure information to a computing device, e.g., the computing device 550 of FIG. 5B, where such information can be utilized in the processes described herein.

In the aspect depicted in FIG. 8, the liquid conduit 570 can extend from the liquid intake 572 at a first end 573 to the first mixer 580 at a second end 575. As discussed above, the liquid can include water, hydrocarbons or a combination thereof. In one aspect, the hydrocarbons can include a crude oil. In the same or alternative aspects, the liquid can include a crude oil produced from the well where the artificial lift process is occurring.

In aspects, the liquid conduit 570a may direct the liquid communicated from the liquid source to the liquid pump 574. In the aspect depicted in FIG. 8, a pressure gauge 576 may be positioned between the liquid intake 572 and the liquid pump 574 to measure the pressure of the liquid line upstream of the liquid pump 574. In such aspects, the liquid pump 574 may be configured to pump the liquid and/or the liquid and gas mixture through the liquid pump exit conduit 570b and on through the remaining portion of the system components and out through the outlet 582 to a well. In an aspect not depicted in FIG. 8, a valve may be coupled to the outlet 582.

In aspects, the liquid pump 574 can include an electric motor. In such aspects, a variable frequency drive, e.g., the variable frequency drive 540 of FIG. 1B, may control the amount of power going into the electric motor of the liquid pump 574 in order to control the flow rate of the output liquid. In such aspects, a computing device, e.g., the computing device 550 of FIG. 5B, can operate or direct the operation of the variable frequency drive.

In aspects, a recirculation conduit 571 can optionally be included in order to aid in controlling the pressure in the liquid pump exit conduit 570b. In such aspects, the use of the recirculation conduit 571 can allow for the control of the pressure and flow rate independent of one another. As can be seen in the aspect depicted in FIG. 8, a pump discharge pressure gauge 570c may be coupled to the liquid pump exit conduit 570b and adapted to monitor the pressure of the pump discharge in the liquid pump exit conduit 570b. In aspects, a recirculation liquid control valve 579 can permit or block the recirculation of the liquid from the liquid pump exit conduit 570b and through the recirculation conduit 571, which may be returned to a liquid source or a holding vessel. In aspects, a computing device, e.g., the computing device 550 of FIG. 5B, can operate or direct the operation of the recirculation liquid control valve 579.

In aspects, as discussed above, chemical additives can optionally be added to the liquid and gas mixture. For instance, in the aspect depicted in FIG. 8, a chemical additives source 592 can be coupled to a second mixer 584. Further, in the aspect depicted in FIG. 8, a chemical pump 590 can be coupled to the chemical additives source 592 to supply the chemical additives to the second mixer 584 and the liquid in the liquid conduit 570. In certain aspects, the chemical pump 590 can be driven by an electric motor. In such aspects, a variable frequency drive, e.g., the variable frequency drive 540 of FIG. 5B, may control the amount of power going into the electric motor of the chemical pump 590 in order to control the flow rate of the output liquid. In such aspects, a computing device, e.g., the computing device 550 of FIG. 5B, can operate or direct the operation of the variable frequency drive.

In aspects, the chemical additive source 592 can be a tank of one or more chemical additives that is housed within an interior volume of the system housing, e.g., the housing 510 of FIG. 5A. In alternative aspects not depicted in the figures, a chemical additives source can be exterior to the system and can be provided to the system via a chemical conduit. In various aspects, the chemical additives source 592 (and/or an exterior chemical additives source) can include a meter and valve for controlling the rate of chemical additives addition to the liquid in the liquid conduit or the mixture of the liquid and the gas.

In aspects, the chemical additives can include any conventional chemical additives utilized in well extraction processes. For instance in one aspect, the chemical additives can include surfactants, de-emulsifiers, emulsifiers, drag reducing agents, or other chemical additives known to have an impact on multiphase flow and the pattern of flow, such as impacting the transition from one flow pattern to another. In the same or alternative aspects, the chemical additives can include chemical additives that are known to reduce the required surface injection pressures, to reduce the amount of fluid co-injected with the gas in the downward annular injection flow. In various aspects, the chemical additives can include chemical additives that are known to alter the flow in the production string downstream of the gas lift injection point and to alter the flow in a horizontal and near-horizontal sections of pipe such as the horizontal well. In the same or alternative aspects, the chemical additives can include scale inhibitors and/or corrosion inhibitors. In aspects, the chemical additives can include chemicals additives that are different than the liquid being utilized the liquid and gas mixture.

In certain aspects, the liquid being pumped in the liquid conduit 570 can be transported to the first mixer 580 where the liquid (and optionally any chemical additive(s)) is mixed with the gas from the gas conduit 560 prior to being transported to the well via the outlet 582. In aspects, a liquid valve 583 may be placed upstream of the first mixer 580, e.g., between the liquid intake 572 and the first mixer 580, to control the flow rate of the liquid entering the first mixer 580 and/or exiting the outlet 582. In aspects, the liquid valve 583 may be used when disconnecting the system from the well. In aspects, a computing device, e.g., the computing device 550 of FIG. 5B, can operate or direct the operation of the liquid valve 583.

In aspects, the first mixer 580 can be configured to mix the liquid and the gas into a multiphase mixture, e.g., a mixture of the liquid and the gas. In one example aspect depicted in FIG. 8, the first mixer 580 can be a T-conduit fluidly coupled to the gas conduit 560 and the liquid conduit 570. The first mixer 580 can be any other type of convenient mixer for mixing a liquid and a gas, including but not limited to a Y-shaped conduit or sphere-shaped conduit. In the same or alternative aspects, the first mixer 580 can include one or more internal baffles in the conduit to facilitate efficient mixing of the liquid and the gas. In yet another aspect, the first mixer 580 may be configured to include a gas diffuser or sparger. It is appreciated that the second mixer 584 can include any or all of the properties and parameters of the first mixer 580 discussed herein.

In certain aspects, once the liquid and the gas is converted into the mixture of the liquid and the gas in the first mixer 580, the mixture can be transported via a mixture conduit 585 to the outlet 582 and ultimately to the well. In aspects, one or more temperature and/or pressure gauges, e.g., pressure gauge 587 may be positioned in the mixture conduit 585 for providing such information to a computing device, e.g., the computing device 550 of FIG. 5B.

Figure 9:
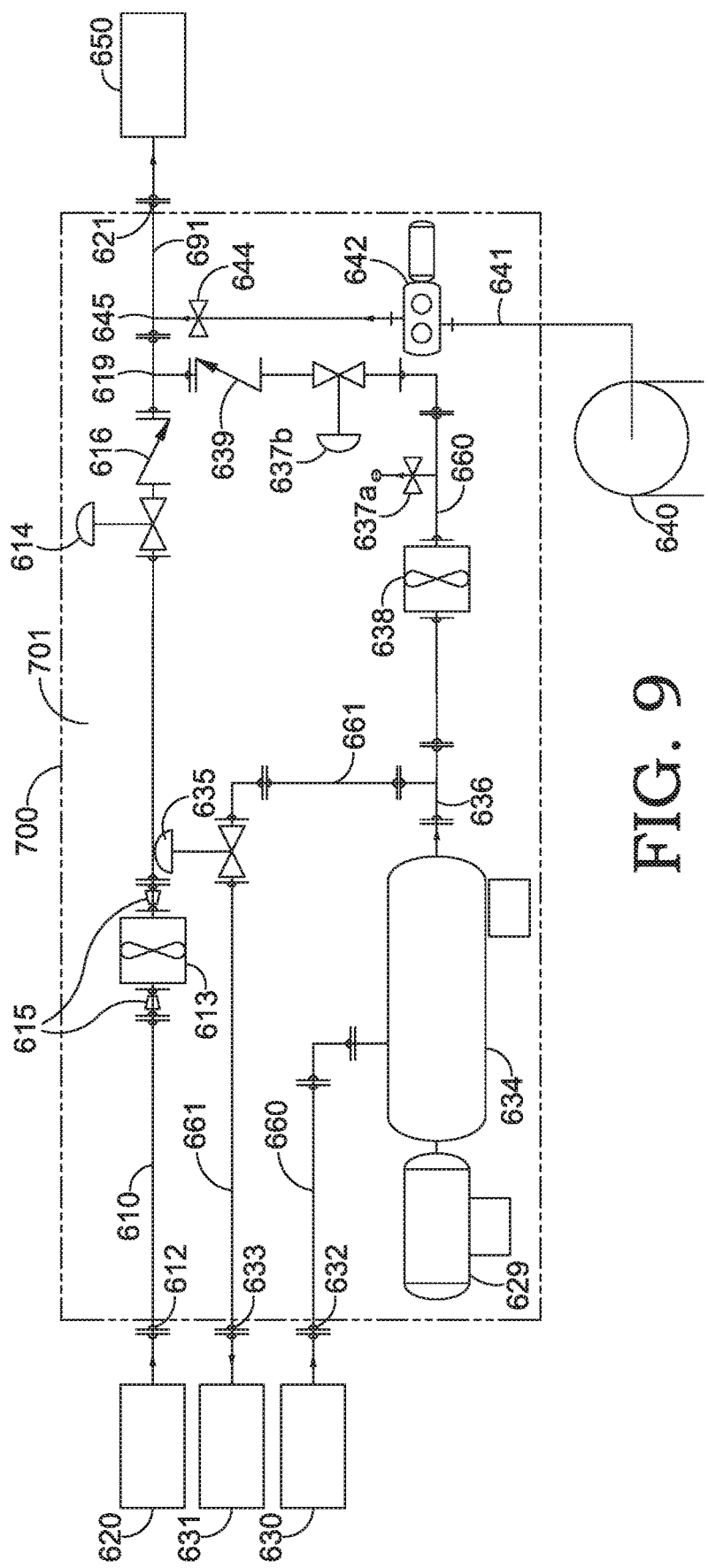
FIG. 9 is a diagrammatic depiction of the relative position of a liquid conduit, a gas conduit, a liquid pump, a chemical additives source, and additional components for use in a system to implement various aspects of processes described herein, in accordance with aspects described herein.

FIG. 9 depicts another example of a configuration for use in the systems and processes disclosed herein. As can be seen in the aspect depicted in FIG. 9, a gas conduit 610 can be coupled to a gas source 620 via a gas intake 612. Further in the aspect depicted in FIG. 9, the gas conduit 610 can include a liquid meter 613 placed between needle valves 615. Additionally in aspects, the gas conduit 610 can include a gas flow control valve 614 between the gas source 620 and the first mixer 619. In various aspects, a check valve 616 can be positioned along the gas conduit 610 between the gas flow control valve 614 and the first mixer 619 in order to prevent backflow from the first mixer 619 into the gas conduit 610. In aspects, the gas source 620 can include one or more of the gases mentioned above for use in the injection systems and processes disclosed herein. In various aspects one or more of the liquid meter 613, the gas flow control valve 614, or the check valve 616 can be in communication with a computing device, e.g., the computing device 550 of FIG. 5B. In such aspects, the computing device can operate or direct the operation of the gas flow control valve 614 in order to control or modulate the flow rate of the gas into the first mixer 619.

As can be seen in the aspect depicted in FIG. 9, a liquid conduit 660 can be coupled to a liquid source 630 via a liquid intake 632. In various aspects, the liquid source 630 can include any or all of the properties of the liquids and liquid source described above with reference to FIG. 8. The liquid conduit 660 can extend from the liquid intake 632 to a liquid pump 634 and on to the first mixer 619. In aspects, the liquid pump 632 can comprise an electric motor 629, which in turn may be controlled or operated by a computing device via a variable frequency drive, as discussed above with reference to FIG. 8. In aspects, a recirculation conduit 661 can optionally be included to aid in controlling the pressure in the portion 636 of the liquid conduit 660 adapted to receive the pumped liquid from the liquid pump 634. In such aspects, a recirculation liquid control valve 635 can permit or block the recirculation of the liquid from the portion 636 of the liquid conduit 660 and through the recirculation conduit 661, which may be returned to a holding vessel 631.

The liquid conduit 660 can include, in aspects, a liquid meter 638 and one or more valves, e.g., a needle valve 637*a* and a liquid flow control valve 637*b*, positioned between the liquid pump 634 and the first mixer 619. In the same or alternative aspects, the liquid conduit 660 can include a liquid check valve 639 to prevent backflow from the first mixer 619 into the liquid conduit 660.

As can be seen in the aspect depicted in FIG. 9, a chemical additives conduit 641 can be coupled to a chemical additives source 640 and operable to provide one or more chemical additives to a mixture of the liquid and the gas downstream of the first mixer 619 in the mixture conduit 691. In aspects, the chemical additives and the chemical additives source 640 can include any or all of the properties of the chemical additives and the chemical additives source discussed above with reference to FIG. 8.

In aspects, a chemical pump 642 can be coupled to the chemical additives conduit 641 in order to provide the flow of the chemical additives from the chemical additives source 640 to the second mixer 645, where the chemical additives can be incorporated into the mixture of the liquid and the gas. In aspects, a chemical additives needle valve 644 or other valve can be positioned along the chemical additives conduit 641 between the chemical pump 642 and the second mixer 645 to control the flow of chemical additives into the mixture conduit 691 and ultimately through an outlet 621 and into a well 650.

In the aspect depicted in FIG. 9, a skid 700, or base member of a frame assembly, can support the conduits and components depicted in the interior portion 701 of the skid 700. As depicted in FIG. 9, the chemical additives source 640, the gas source 620, the supplemental liquid source 631, and the liquid source 630 are external to the interior portion 701 of the skid 700.

As discussed above, in various aspects the systems and processes herein can utilize a computing device to identify various parameters, e.g., one or more of well geometry parameters, well productivity parameters, produced fluids properties, or surface production parameters discussed above, and tailor a flow rate of the liquid and gas mixture and/or tailor the compositional makeup of the mixture by controlling the flow rate of the liquid and/or the gas. For instance, as noted above, such a computing device can identify various parameters, e.g., one nor more of well geometry parameters, well productivity parameters, produced fluids properties, or surface production parameters and operate or direct the operation of one or more of the valves or pumps discussed above in order to control the flow rate or flow of the gas, the liquid, the chemical additives, or a combination thereof.

Figure 10:
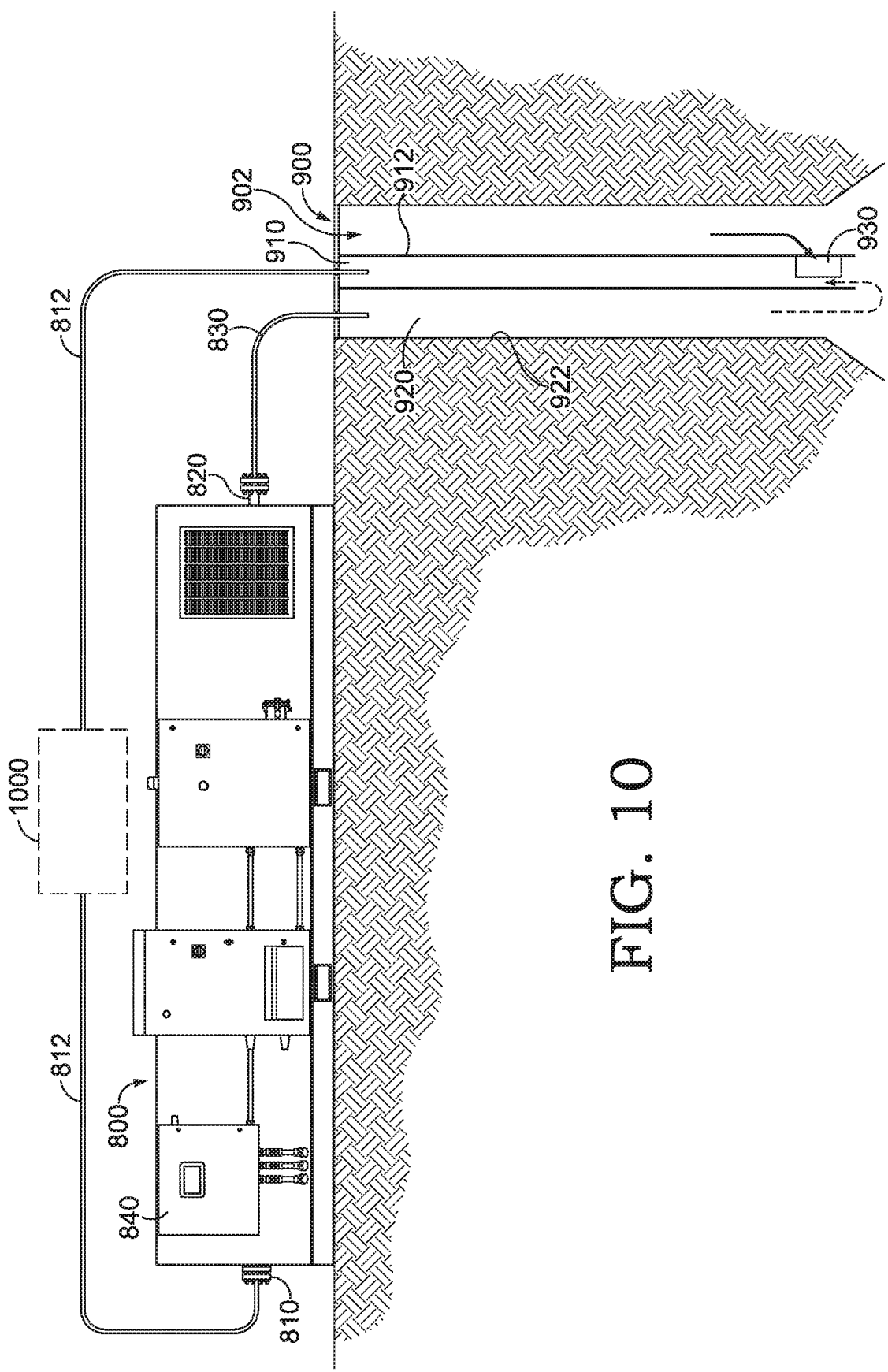
FIG. 10 depicts an example system adjacent to a well, where the liquid inlet of the system is in fluid communication with the interior of the production tubing of the well, and where the outlet of the system is in fluid communication with the annulus of the well, in accordance with aspects described herein.

As discussed above, in various aspects, the systems and processes disclosed herein can be utilized to increase well production, for example, by injecting a mixture of a gas and a liquid into a well. FIG. 10 depicts an example injection system 800 coupled to a well 900. In various aspects, the injection system 800 of FIG. 10 can include any or all of the parameters discussed above with respect to FIGS. 5A-9. It should be understood that while the well 900 depicted in FIG. 10 is generally a vertically oriented well, the systems and processes disclosed herein can also be utilized on horizontal wells. That is in certain aspects, the injection systems disclosed herein can be coupled to a vertical or a horizontal well for injecting a liquid and gas mixture therein, e.g., to increase well production.

The well 900 and associated components, in aspects, can be similar to the well 100 and associated components discussed above with respect to FIG. 1. For example, as can be seen in FIG. 10, the well 900 includes a borehole 902 that extends into the ground to a formation (not depicted in the figures). In the aspect depicted in FIG. 10, the borehole 902 includes a production tubing 910 extending through at least a portion of the borehole 902 and is adapted to permit production fluids, including but not limited to crude oil, to be extracted from the formation. Further, as can be seen in FIG. 10, there is a annulus 920 that is the space between the exterior 912 of the production tubing 910 and the surface 922 of the borehole 902.

In various aspects of the systems and processes described herein, the mixture of the liquid and the gas, can exit an outlet 820 of the injection system 800 and be injected into the annulus 920 via a conduit 830. In such aspects, the mixture of the liquid and the gas may travel down the borehole 902 to a deep-set valve 930 coupled to the production tubing 910, where the liquid and/or the gas is transported into the production tubing 910, as indicated by the solid arrow extending down to the deep-set valve 930. In an aspect not depicted in the figures, as discussed above, there may not be a valve at or near the bottom of the production tubing and the systems described herein can provide the mixture to the bottom of the production tubing where such mixture can enter the production tubing, as indicated by the dashed arrow extending down the annulus 920 and into the production tubing 910.

It should be understood that while this one example operation depicted in FIG. 10 describes the gas, liquid, or mixture thereof being injected from the injection system 800 and into the annulus 920 and ultimately into the production tubing 910 to facilitate increased extraction of production fluids by traveling through the production tubing 910 and out of the well 900, an alternative operation is also contemplated by the systems and processes described herein. For instance, in one aspect, the gas, liquid, or mixture thereof can be injected from the injection system 800 and into the production tubing 910 and thereby travel downhole and enter the annulus 920 via a valve or bottom of the tubing to facilitate extraction of production fluids out and through the annulus 920.

As discussed above, in various aspects, the systems and processes disclosed herein can include utilizing a liquid that comprises hydrocarbons in the mixture of the liquid and the gas. In such aspects, the systems disclosed herein can utilize a production fluid, e.g., a crude oil from the well, as the liquid source or liquid for use as at least one component of the liquid in the mixture of a liquid and a gas for injecting into the well. FIG. 10 depicts one example arrangement where an injection system, e.g., the injection system 800, is adapted to receive a production fluid as a liquid source. As can be seen in FIG. 10, a conduit 812 is coupled to a liquid inlet 810 and extends into the production tubing 910 so that the production fluid, for example a crude oil, can be utilized in the systems and processes disclosed herein. As depicted in FIG. 10, the production fluid may be exposed to one or more post-production systems or processes, e.g., the system 1000, prior to transporting the crude oil or other fluid to the liquid inlet 810. A non-limiting list of post-production systems and processes includes the use of one or more separators to remove water, other liquids, and/or gas, and the use of a storage vessel from which the crude oil can be withdrawn.

In various aspects as discussed above, the flow rate of the mixture exiting the outlet 820 and being injected into the annulus 920 can be tailored based on identifying one or more of well geometry parameters, well productivity parameters, produced fluids properties, or surface production parameters. In such aspects, a computing device 840 can identify and/or receive information on one or more of well geometry parameters, well productivity parameters, produced fluids properties, or surface production parameters to determine the flow rate of the mixture of the liquid and the gas. The flow rate of the mixture of the liquid and the gas can be adjusted as discussed above with reference to FIGS. 5A-9.

In such aspects and not depicted in the figures, one or more flow meters, pressure gauges, and/or temperature gauges may be placed at any specific location in the production tubing 910, annulus 920, borehole 902, conduit 830, and/or conduit 812, and be adapted to transmit such information to the computing device 840 for use in tailoring the flow rate of the liquid and gas mixture.

Figure 11:
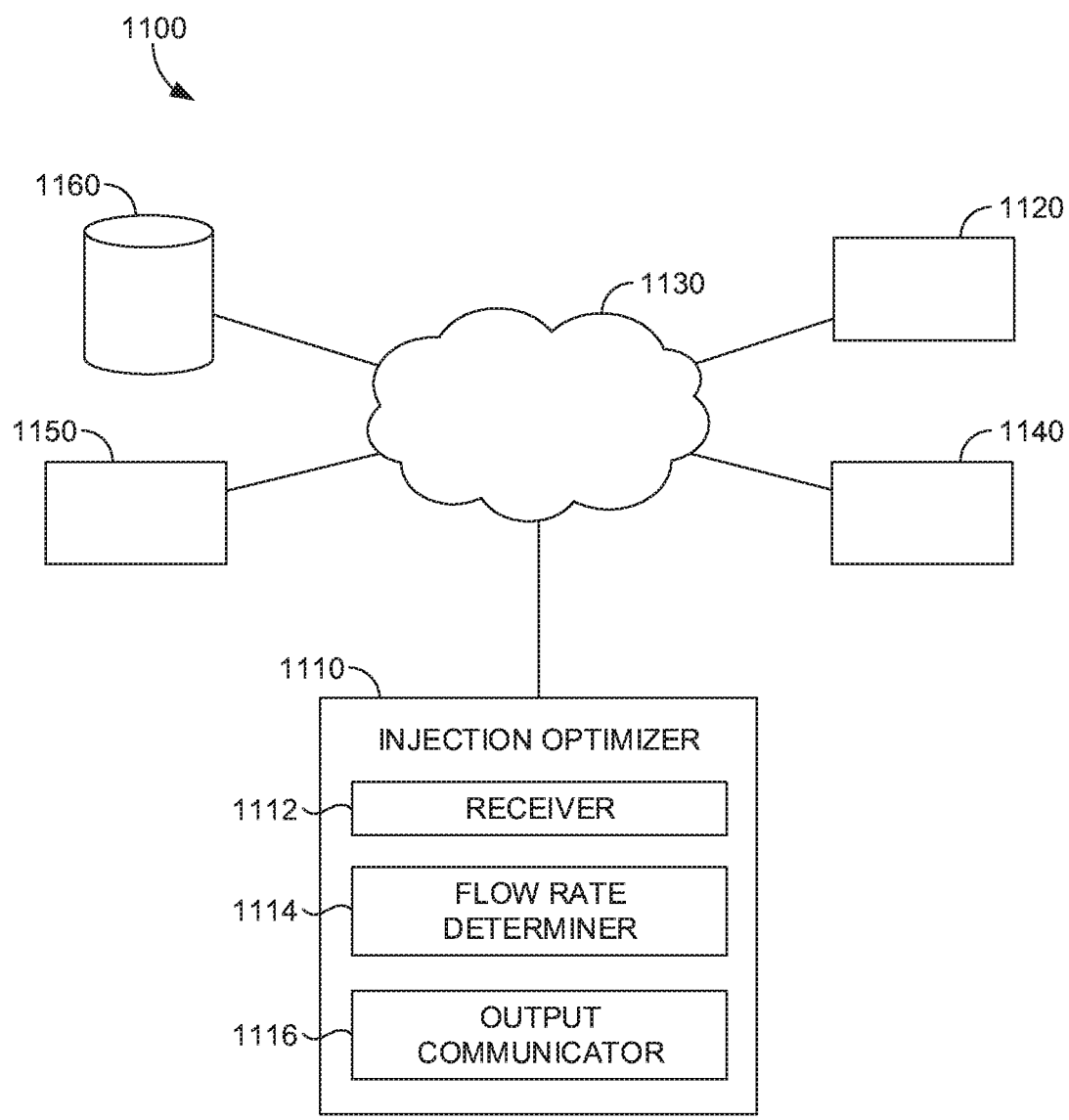
FIG. 11 is a block diagram of an example system that includes an injection optimizer, in accordance with aspects described herein.

FIG. 11 depicts a system 1100 for use in implementing aspects described herein for optimizing the injection of the liquid and gas mixture into a well and/or for tailoring the flow rates of the liquid and the gas into the well. It should be understood that the system 1100 is an example of one suitable computing system environment and is not intended to suggest any limitation as to the scope of use or functionality of aspects of the present invention. Neither should the system 1100 of FIG. 11 be interpreted as having any dependency or requirement related to any single source module, service, or device illustrated therein.

Generally, the system 1100 can include an injection optimizer 1110 that can identify or receive a variety of inputs or information, such as one or more of well geometry parameters, well productivity parameters, produced fluids properties, or surface production parameters, to tailor or optimize the relative amounts of the gas and liquid in the mixture being injected into a well and/or the flow rate of the mixture being injected into the well, e.g., to increase well production. In aspects, the system 1100 may include the injection optimizer 1110, one or more sensors 1120, one or more computing devices 1140, one or more controllers 1150, and optionally one or more data sources 1160. In aspects, the injection optimizer 1110, one or more sensors 1120, one or more computing devices 1140, one or more controllers 1150, and one or more data sources 1160 may be in communication with each other, through wired or wireless connections, and/or through a network 1130. The network 1130 may include, without limitation, one or more local area networks (LANs) and/or wide area networks (WANs). Such networking environments are commonplace in enterprise-wide computer networks, intranets, and the Internet. Accordingly, the network 1130 is not further described.

In one or more aspects, the one or more sensors 1120 can include any sensors that can identify or provide information related to one or more of the well geometry parameters, well productivity parameters, produced fluids properties, or surface production parameters discussed above. In such aspects, the one or more sensors 1120 can include any or all of the sensors, flow meters, pressure gauges, and temperature gauges utilized in an artificial lift system, including sensors associated with liquid and/or gas conduits and sensors in or near the well. In aspects, the one or more sensors 1120 can include any or all of the sensors, flow meters, or gauges discussed above with reference to FIGS. 8 and 9 that are operable to measure flow rate, temperature, and/or pressure, of the liquid, gas, or mixture thereof. In the same or alternative aspects, the one or more sensors 1120 can include one or more pressure and/or temperature sensors downhole, e.g., a pressure sensor operably coupled to a downhole injection valve, e.g., the deep-set valve 930 discuss above with reference to FIG. 10. In further aspects, the one or more sensors 1120 can include one or more sensors associated with measuring various properties of the production fluid, tubing, casing head, or a combination thereof.

In certain aspects, the one or more data sources 1160 can include any information associated with the well, source gas, source liquid, or produced fluids. For instance, in one aspect, the one or more data sources 1160 can include information associated with the well geometry parameters, well productivity parameters, produced fluids properties, or surface production parameters. For instance in aspects, the one or more data sources 1160 can include information associated with the well geometry, historical well production parameters, or produced fluid parameters. In one aspect, the one or more data sources 1160 can include prior parameter information, while the one or more sensors 1120 can include real-time or near real-time parameter information.

In aspects, the one or more controllers 1150 can include any device capable of adjusting a valve, pump, motor associated with a valve or pump, or the like for controlling the flow or flow rate of a liquid, gas, or a mixture thereof. In aspects, the one or more controllers 1150 can be associated with any of the flow control valves, electric motors, or pumps discussed above, such as the flow control valves, electric motors, or pumps described in the systems of FIGS. 8 and 9.

In various aspects, the injection optimizer 1110 can include a receiver 1112, a flow rate determiner 1114, and an output communicator 1116. In aspects, the receiver 1112, the flow rate determiner 1114, and the output communicator 1116 may be implemented as one or more stand-alone applications. Further, various services and/or modules may be located on any number of servers. By way of example only, the injection optimizer 1110 may reside on a server, cluster of servers, a cloud-computing device or distributed computing architecture, or a computing device remote from one or more of the data sources 1160, the one or more computing devices 1140, or the one or more controllers 1150. In certain aspects, one or more services or modules of the injection optimizer 1110 may reside in one or more of the one or more computing devices 1140 associated with the injection systems described herein. In the same or alternative aspects, one or more services and/or modules of the injection optimizer 1110 may reside in one or more servers, cluster of servers, cloud-computing devices or distributed computing architecture, or a computing device remote from the one or more computing devices 1140 associated with the artificial lift systems described herein.

In various aspects, the receiver 1112 of the injection optimizer 1110 can receive information from the one or more sensors 1120 and/or the one or more data sources 1160. In certain aspects, the information from the one or more sensors 1120 and/or the one or more data sources 1160 may be transmitted to and received by the receiver 1112 via the network 1130 and may include wired or wireless transmission of the information, including but not limited to a physical USB connection, an Ethernet connection, a Bluetooth connection, near-field communication, WiFi communication, wireless USB communication, optical communication, such as IrDA, a cellular network or a combination thereof. In aspects, the one or more computing devices 1140 may transmit to the receiver 1112 data from the one or more data sources 1160 and/or the one or more sensors 1120.

In aspects, once the injection optimizer 1110 has received the information from the one or more sensors 1120 and/or the one or more data sources 1160, the flow rate determiner 1114 utilizes that information to determine a flow rate of the liquid and/or the gas in the mixture, and/or utilizes that information to determine the relative amounts of the liquid and the gas in the mixture.

In one example, as discussed above, the relative amounts of the gas and liquid in the mixture and/or the flow rate of the mixture can be determined by the flow rate determiner 1114, based on one or more of: well geometry parameters, well productivity parameters, produced fluids properties, or surface production parameters received by the receiver 1112, in an effort to: increase well production, decrease the downhole pressure, decrease the density of the production fluid, or a combination thereof. Additionally or alternatively, in an example aspect, the relative amounts of the gas and liquid in the mixture and/or the flow rate of the mixture can be tailored or optimized based on one or more of: well geometry parameters, well productivity parameters, produced fluids properties, or surface production parameters received by the receiver 1112, in an effort to: increase well production, decrease the downhole pressure, decrease the density of the production fluid, or a combination thereof.

In another example also discussed above, once the injection optimizer 1110 has received the information, e.g., one or more of the well geometry parameters, well productivity parameters, produced fluids properties, or surface production parameters, from the one or more sensors 1120 and/or the one or more data sources 1160, the flow rate determiner 1114 can determine the liquid and/or gas injection or flow rates sufficient to facilitate downward bubble flow in the well.

It should be understood that the above examples are only a few scenarios to demonstrate the functionality of the flow rate determiner 1114 and that any combination of other information from the one or more data sources 1160 and/or the sensors 1120 can be utilized to optimize the flow rates of the liquid and/or the gas in the mixture for injecting into the well, and/or to determine the compositional parameters of the liquid and the gas in the mixture.

In aspects, the output communicator 1116 communicates to the one or more controllers 1150 and/or the one or more computing devices 1140 the determined flow rates for the liquid and/or the gas in the liquid and gas mixture. For instance in one aspect, the output communicator 1116 can communicate with the one or more controllers 1150 to adjust the flow rate of the liquid, the gas or the liquid and the gas. As noted above, the one or more controllers 1150 can be associated with any of the flow control valves, electric motors, or pumps discussed above. In one aspect, the output communicator 1116 can communicate the determined flow rates for the liquid and/or the gas in the liquid and gas mixture to the one or more computing devices 1140, where the one or more computing devices 1140, in turn, can directly or indirectly communicate the determined flow rates, or operations or instructions that achieve the determined flow rates, to components that control the one or more valves, electric motors, or pumps. For instance in one example, the one or more computing devices 1140 can provide instructions to control the amount of power going to an electric motor that controls one or more of a liquid pump, a flow control valve, or a pump.

Figure 12:
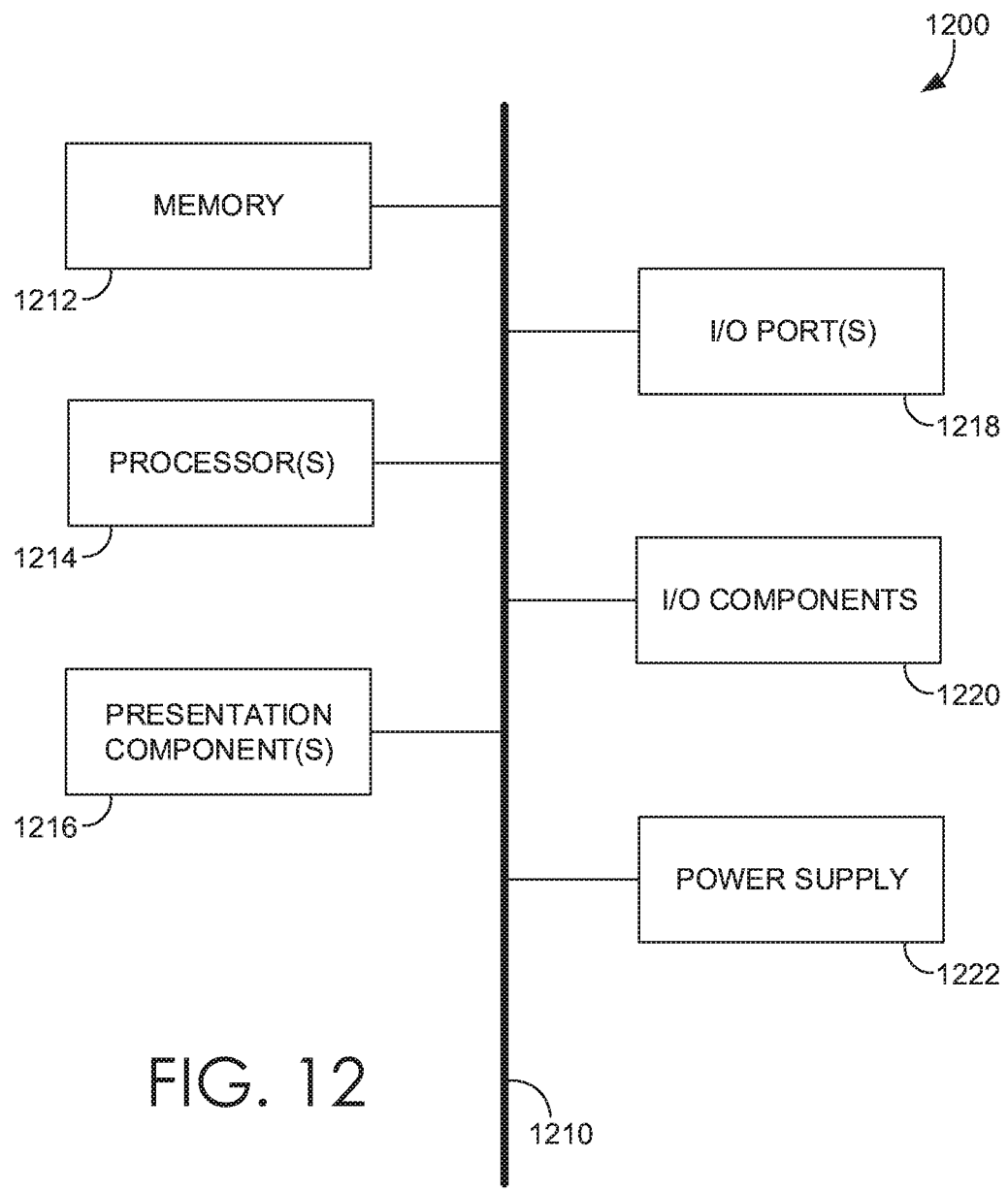
FIG. 12 is a block diagram of an example computing environment suitable to implement aspects described herein.

FIG. 12 depicts one example operating environment for a computing device in which aspects of the present disclosure may be implemented is described below in order to provide a general context for various aspects of the present disclosure. Referring to FIG. 12, an example operating environment for implementing aspects of the present disclosure is shown and designated generally as computing device 1200. The computing device 1200 is but one example of a suitable computing environment and is not intended to suggest any limitation as to the scope of use or functionality of aspects disclosed herein. Neither should the computing device 1200 be interpreted as having any dependency or requirement relating to any one component nor any combination of components illustrated.

Aspects herein may be described in the general context of computer code or machine-useable instructions, including computer-useable or computer-executable instructions such as program modules, being executed by a computer or other machine, such as a personal computing device. Generally, program modules including routines, programs, objects, components, data structures, and the like, and/or refer to code that performs particular tasks or implements particular abstract data types. Aspects disclosed herein may be practiced in a variety of system configurations, including handheld devices, consumer electronics, general-purpose computers, more specialty computing devices, and the like. Aspects disclosed herein may also be practiced in distributed computing environments where tasks are performed by remote-processing devices that are linked through a communications network.

With continued reference to FIG. 12, the computing device 1200 includes a bus 1210 that directly or indirectly couples the following devices: a memory 1212, one or more processors 1214, one or more optional presentation components 1216, one or more input/output (I/O) ports 1218, one or more I/O components 1220, and an illustrative power supply 1222. The bus 1210 represents what may be one or more busses (such as an address bus, data bus, or combination thereof). Although the various blocks of FIG. 12 are shown with lines for the sake of clarity, in reality, these blocks represent logical, not necessarily actual, components. For example, one may consider a presentation component such as a display device to be an I/O component. Also, processors have memory. It is appreciated that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

The computing device 1200 typically includes a variety of computer-readable media. Computer-readable media may be any available media that can be accessed by the computing device 1200 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1200. Combinations of any of the above are also included within the scope of computer-readable media.

The memory 1212 includes computer-storage media in the form of volatile and/or nonvolatile memory. The memory may be removable, non-removable, or a combination thereof. Exemplary hardware devices include solid-state memory, hard drives, optical-disc drives, and the like. The computing device 1200 includes one or more processors that read data from various entities such as the memory 1212 or the I/O components 1220. The optional presentation component(s) 1216 present data indications to a user or other device. Exemplary presentation components include a display device, speaker, printing component, vibrating component, and the like.

The I/O ports 1218 allow the computing device 1200 to be logically coupled to other devices including the I/O components 1220, some of which may be built in. Illustrative components include a microphone, joystick, game pad, satellite dish, scanner, printer, wireless device, and the like.

Figure 13:
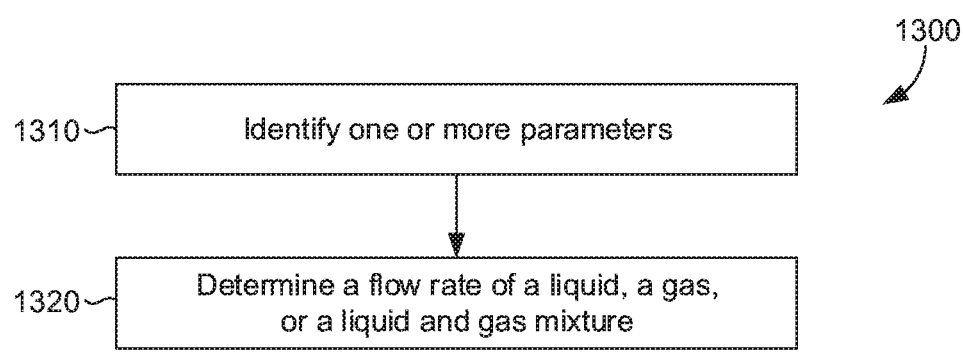
FIG. 13 is a flow diagram illustrating one method for injecting a mixture of a liquid and a gas into a well, in accordance with aspects described herein.

FIG. 13 depicts a flow diagram illustrating a method 1300 for increasing well production while a well is currently producing a production fluid. At step 1310, the method 1300 includes identifying one or more parameters. In aspects, the one or more parameters can include any or all of the parameters discussed above with reference to the injection processes and systems. For instance in one aspect, the one or more parameters can include one or more of: well geometry parameters, well productivity parameters, produced fluids properties, or surface production parameters. In aspects, the one or more parameters can be provided by or received from the one or more sensors 1120 and/or the one or more data sources 1160 discussed above with reference to the system 1100 of FIG. 11.

At step 1320, the method 1300 includes determining a first flow rate of a liquid, a gas, or a liquid and gas mixture. In aspects, the step 1320 can include determining a first flow rate of a liquid, a gas, or a liquid and gas mixture based on the one or more parameters identified in step 1310. For instance, in such an aspect, the first flow rate of the liquid, gas, or liquid and gas mixture can be tailored based on the identifying of step 1310 for injecting into a well to: increase well production, decrease the downhole pressure, decrease the density of the production fluid, or a combination thereof. In the same or alternative aspects, the flow rate of the liquid, gas, or liquid and gas mixture can be tailored based on the identifying of step 1310 to facilitate downward gas bubble flow in the well. In aspects, determining a flow rate of a liquid, a gas, or a liquid and gas mixture based on the one or more parameters identified in step 1310 can include the use of the injection optimizer 1110 discussed above with reference to the system 1100 of FIG. 11. In aspects not depicted in the figures, the method 1300 can also include subsequent to determining a flow rate of the liquid, identifying one or more second parameters, such as one or more of: well geometry parameters, well productivity parameters, produced fluids properties, or surface production parameters. In aspects, the one or more second parameters can be provided by or received from the one or more sensors 1120 and/or the one or more data sources 1160 discussed above with reference to the system 1100 of FIG. 11. In further aspects, based on the one or more second parameters, the method 1300 can include determining a second flow rate of the liquid and gas mixture that is different than the first flow rate, in order to increase well production relative to that achieved with the injection of the liquid and gas mixture at the first flow rate. In one aspect, the second flow rate of the liquid and gas mixture can include a decreased amount of liquid in the mixture and/or an increased amount of gas in the mixture.

ADDITIONAL EMBODIMENTS

Embodiment 1. A method for injection of a liquid and a gas mixture into a well that is producing a production fluid at a first production rate, wherein the well comprises a borehole extending into the ground to a formation, the borehole having at least one production tubing extending through at least a portion of the borehole, the method comprising: injecting a first mixture of a liquid and a gas into the well while the well is producing the production fluid at the first production rate, wherein the first mixture is injected at a first flow rate to cause the well to increase production of the production fluid to a second production rate that is greater than the first production rate.

Embodiment 2. The method according to embodiment 1, wherein the liquid of the first mixture comprises liquid hydrocarbons.

Embodiment 3. The method according to embodiment 1 or 2, wherein the hydrocarbons comprise crude oil.

Embodiment 4. The method according to embodiment 3, wherein the crude oil was produced from the well.

Embodiment 5. The method according to any of embodiments 1-4, wherein the gas comprises methane.

Embodiment 6. The method according to any of embodiments 1-5, wherein the gas is present in the mixture in an amount of from 10% by volume of the mixture to 99% by volume of the mixture.

Embodiment 7. The method according to any of embodiments 1-6, further comprising, prior to the injecting the first mixture of the liquid and the gas into the well, forming the first mixture at a location proximal to the well.

Embodiment 8. The method according to any of embodiments 1-7, further comprising, prior to the injecting the first mixture of the liquid and the gas into the well, determining the first flow rate based on one or more of well geometry parameters, well productivity parameters, produced fluids properties, or surface production parameters.

Embodiment 9. The method according to embodiment 8, wherein the well geometry parameters comprise one or more of: an internal diameter of well tubing, an external diameter of well tubing, an internal diameter of a casing string, a depth of the casing string, an inclination of the casing string, a diameter of the vertical wellbore section, a depth of the vertical section, or a depth of an injection valve; wherein the produced fluids properties comprise one or more of: a density of the well-produced fluids, an API gravity of the produced fluids, such as an API gravity of the oil or condensate, a viscosity of the well-produced fluids, a pressure of the well-produced fluids, a volume of the well-produced fluids, or a temperature of the well-produced fluids; wherein the well productivity parameters comprises one or more of: an average reservoir pressure, a flow potential for the well, production rates from the well, an average oil or condensate rate, an average water rate (barrels per day), an average gas rate, a flowing tubing pressure, a wellhead pressure, a choke setting, a well head flowing temperature; and wherein the surface production parameters comprise one or more of: a gas conduit pressure, a liquid conduit pressure, a liquid and gas mixture conduit pressure, an outlet pressure, a well head shut-in pressure, a well head shut-in temperature, a production line pressure, a separator pressure, a casing head shut-in temperature, a casing head shut-in pressure, the gas volume available or extractable from the gas source, or source gas pressure.

Embodiment 10. The method according to any of embodiments 1-9, further comprising, subsequent to the injecting the first mixture of the liquid and the gas into the well, identifying one or more of well geometry parameters, well productivity parameters, produced fluids properties, or surface production parameters.

Embodiment 11. The method according to embodiment 10, further comprising, subsequent to the identifying one or more of well geometry parameters, well productivity parameters, produced fluids properties, or surface production parameters, injecting a second mixture of a liquid and a gas into the well, wherein the second mixture is different than the first mixture.

Embodiment 12. The method according to any of embodiments 1-11, wherein, prior to the injecting the first mixture of the liquid and the gas into the well, the at least one production tubing comprises a first volume of production fluid therein having a first density, and wherein, subsequent to the injecting the first mixture of the liquid and the gas into the well, the at least one production tubing comprises a second volume of production fluid therein having a second density, the second density being less than the first density.

Embodiment 13. A method for injection of a liquid and gas mixture into a producing well, wherein the well comprises a borehole extending into the ground to a formation, the borehole having at least one production tubing extending through at least a portion of the borehole, the method comprising: injecting a first mixture of a liquid and a gas into the well while the well is producing a first volume of production fluid, the first volume of production fluid having a first density, wherein the first mixture is injected at a first flow rate thereby resulting in the formation of a second volume of production fluid, the second volume of production fluid having a second density that is less than the first density.

Embodiment 14. The method according to embodiment 13, wherein the liquid of the first mixture comprises liquid hydrocarbons.

Embodiment 15. The method according to embodiment 14, wherein the hydrocarbons were produced from the well.

Embodiment 16. The method according to any of embodiments 13-15, wherein the gas comprises methane.

Embodiment 17. The method according to any of embodiments 13-16, wherein the gas is present in the mixture in an amount of from 10% by volume of the mixture to 99% by volume of the mixture.

Embodiment 18. The method according to any of embodiments 13-17, further comprising, prior to the injecting the first mixture of the liquid and the gas into the well, determining the first flow rate based on one or more of well geometry parameters, well productivity parameters, produced fluids properties, or surface production parameters.

Embodiment 19. The method according to any of embodiments 13-18, further comprising, prior to the injecting the first mixture of the liquid and the gas into the well, determining a relative amount of the liquid and a relative amount of the gas in the first mixture, based on one or more of well geometry parameters, well productivity parameters, produced fluids properties, or surface production parameters.

Embodiment 20. The method according to embodiments 18 or 19, wherein the well geometry parameters comprise one or more of: an internal diameter of well tubing, an external diameter of well tubing, an internal diameter of a casing string, a depth of the casing string, an inclination of the casing string, a diameter of the vertical wellbore section, a depth of the vertical section, or a depth of an injection valve; wherein the produced fluids properties comprise one or more of: a density of the well-produced fluids, an API gravity of the produced fluids, such as an API gravity of the oil or condensate, a viscosity of the well-produced fluids, a pressure of the well-produced fluids, a volume of the well-produced fluids, or a temperature of the well-produced fluids; wherein the well productivity parameters comprises one or more of: an average reservoir pressure, a flow potential for the well, production rates from the well, an average oil or condensate rate, an average water rate (barrels per day), an average gas rate, a flowing tubing pressure, a wellhead pressure, a choke setting, a well head flowing temperature; and wherein the surface production parameters comprise one or more of: a gas conduit pressure, a liquid conduit pressure, a liquid and gas mixture conduit pressure, an outlet pressure, a well head shut-in pressure, a well head shut-in temperature, a production line pressure, a separator pressure, a casing head shut-in temperature, a casing head shut-in pressure, the gas volume available or extractable from the gas source, or source gas pressure.

Embodiment 21. A computing device having at least one processor and computer-readable instructions stored thereon, the computer-readable instructions, when executed by the at least one processor cause the computing device to: identify one or more of: well geometry parameters, well productivity parameters, produced fluids properties, or surface production parameters; and based on the identifying one or more of: well geometry parameters, well productivity parameters, produced fluids properties, or surface production parameters, determine a first flow rate of a liquid, a gas, or a liquid and gas mixture, for injecting into a well to increase well production of a production fluid.

Embodiment 22. One or more nontransitory computer storage media storing computer-useable instructions that, when used by one or more computing devices, cause the one or more computing devices to perform operations comprising: identifying one or more of: well geometry parameters, well productivity parameters, produced fluids properties, or surface production parameters; and based on the identifying one or more of: well geometry parameters, well productivity parameters, produced fluids properties, or surface production parameters, determining a first flow rate of a liquid, a gas, or a liquid and gas mixture, for injecting into a well to increase well production of a production fluid.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for injection of a liquid and a gas mixture into a well that is producing a production fluid at a first production rate, wherein the well comprises a borehole extending into the ground to a formation, the borehole having at least one production tubing extending through at least a portion of the borehole, the method comprising:
    measuring fluid properties at a surface level of the at least one production tubing and measuring fluid dynamics occurring within the at least one production tubing while the well is producing fluid at the first production rate;
    determining a first mixture of a liquid and gas to be injected into the well based upon the measurements;
    injecting the first mixture of a liquid and a gas into the borehole, communicating the first mixture to a portion of the at least one production tubing containing the production fluid, wherein the first mixture is injected at a first flow rate to cause the well to increase production of the production fluid to a second production rate that is greater than the first production rate; and
    adjusting gas and liquid mixture compositions and flow-rates over time to facilitate downward bubble flow based on the measured fluid properties at the surface level of the at least one production tubing by repeating the measuring, determining, and injecting steps recited above sequentially in an iterative feedback process.

2. The method according to claim 1, wherein the liquid of the first mixture comprises liquid hydrocarbons.

3. The method according to claim 2, wherein the hydrocarbons comprise crude oil.

4. The method according to claim 3, wherein the crude oil was produced from the well.

5. The method according to claim 1, wherein the gas comprises methane.

6. The method according to claim 1, wherein the gas is present in the mixture in an amount of from 10% by volume of the mixture to 99% by volume of the mixture.

7. The method according to claim 1, further comprising, prior to the injecting the first mixture of the liquid and the gas into the well, forming the first mixture at a location proximal to the well.

8. The method according to claim 1, further comprising, prior to the injecting the first mixture of the liquid and the gas into the well, determining the first flow rate based on one or more of well geometry parameters, well productivity parameters, produced fluids properties, or surface production parameters.

9. The method according to claim 8, wherein the well geometry parameters comprise one or more of: an internal diameter of well tubing, an external diameter of well tubing, an internal diameter of a casing string, a depth of the casing string, an inclination of the casing string, a diameter of the vertical wellbore section, a depth of the vertical section, or a depth of an injection valve; wherein the produced fluids properties comprise one or more of: a density of the well-produced fluids, an API gravity of the produced fluids, such as an API gravity of the oil or condensate, a viscosity of the well-produced fluids, a pressure of the well-produced fluids, a volume of the well-produced fluids, or a temperature of the well-produced fluids; wherein the well productivity parameters comprises one or more of: an average reservoir pressure, a flow potential for the well, production rates from the well, an average oil or condensate rate, an average water rate (barrels per day), an average gas rate, a flowing tubing pressure, a wellhead pressure, a choke setting, a well head flowing temperature; and wherein the surface production parameters comprise one or more of: a gas conduit pressure, a liquid conduit pressure, a liquid and gas mixture conduit pressure, an outlet pressure, a well head shut-in pressure, a well head shut-in temperature, a production line pressure, a separator pressure, a casing head shut-in temperature, a casing head shut-in pressure, the gas volume available or extractable from the gas source, or source gas pressure.

10. The method according to claim 1, further comprising, subsequent to the injecting the first mixture of the liquid and the gas into the well, identifying one or more of well geometry parameters, well productivity parameters, produced fluids properties, or surface production parameters.

11. The method according to claim 10, further comprising, subsequent to the identifying one or more of well geometry parameters, well productivity parameters, produced fluids properties, or surface production parameters, injecting a second mixture of a liquid and a gas into the well, wherein the second mixture is different than the first mixture.

12. The method according to claim 1, wherein, prior to the injecting the first mixture of the liquid and the gas into the well, the at least one production tubing comprises a first volume of production fluid therein having a first density, and wherein, subsequent to the injecting the first mixture of the liquid and the gas into the well, the at least one production tubing comprises a second volume of production fluid therein having a second density, the second density being less than the first density.

13. A method for injection of a liquid and gas mixture into a producing well, wherein the well comprises a borehole extending into the ground to a formation, the borehole having at least one production tubing extending through at least a portion of the borehole, the method comprising:

measuring fluid properties at a surface level of the at least one production tubing and measuring fluid dynamics occurring within the at least one production tubing while the well is producing fluid at the first production rate;

determining a first mixture of a liquid and gas to be injected into the well based upon the measurements;

injecting the first mixture of a liquid and a gas into the borehole, communicating the first mixture to a portion of the at least one production tubing while the well is producing a first volume of production fluid, the first volume of production fluid having a first density, wherein the first mixture is injected at a first flow rate thereby resulting in the formation of a second volume of production fluid, the second volume of production fluid having a second density that is less than the first density; and adjusting gas and liquid mixture compositions and flow-rates over time to facilitate downward bubble flow based on the measured fluid properties at the surface level of the at least one production by repeating the measuring, determining, and injecting steps recited above sequentially in an iterative feedback process.

14. The method according to claim 13, wherein the liquid of the first mixture comprises liquid hydrocarbons, wherein the hydrocarbons were produced from the well.

15. The method according to claim 13, wherein the gas comprises methane.

16. The method according to claim 13, wherein the gas is present in the mixture in an amount of from 10% by volume of the mixture to 99% by volume of the mixture.

17. The method according to claim 13, further comprising, prior to the injecting the first mixture of the liquid and the gas into the well, determining the first flow rate based on one or more of well geometry parameters, well productivity parameters, produced fluids properties, or surface production parameters.

18. The method according to claim 13, further comprising, prior to the injecting the first mixture of the liquid and the gas into the well, determining a relative amount of the liquid and a relative amount of the gas in the first mixture, based on one or more of well geometry parameters, well productivity parameters, produced fluids properties, or surface production parameters.

19. The method according to claim 18, wherein the well geometry parameters comprise one or more of: an internal diameter of well tubing, an external diameter of well tubing, an internal diameter of a casing string, a depth of the casing string, an inclination of the casing string, a diameter of the vertical wellbore section, a depth of the vertical section, or a depth of an injection valve; wherein the produced fluids properties comprise one or more of: a density of the well-produced fluids, an API gravity of the produced fluids, such as an API gravity of the oil or condensate, a viscosity of the well-produced fluids, a pressure of the well-produced fluids, a volume of the well-produced fluids, or a temperature of the well-produced fluids; wherein the well productivity parameters comprises one or more of: an average reservoir pressure, a flow potential for the well, production rates from the well, an average oil or condensate rate, an average water rate (barrels per day), an average gas rate, a flowing tubing pressure, a wellhead pressure, a choke setting, a well head flowing temperature; and wherein the surface production parameters comprise one or more of: a gas conduit pressure, a liquid conduit pressure, a liquid and gas mixture conduit pressure, an outlet pressure, a well head shut-in pressure, a well head shut-in temperature, a production line pressure, a separator pressure, a casing head shut-in temperature, a casing head shut-in pressure, the gas volume available or extractable from the gas source, or source gas pressure.

* * * * *